(12) United States Patent
Meng et al.

(10) Patent No.: US 12,058,054 B2
(45) Date of Patent: Aug. 6, 2024

(54) PACKET TRANSMISSION METHOD AND APPARATUS, AND SYSTEM

(71) Applicant: HUAWEI TECHNOLOGIES CO., LTD., Shenzhen (CN)

(72) Inventors: Rui Meng, Beijing (CN); Chuang Wang, Beijing (CN); Delei Yu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 372 days.

(21) Appl. No.: 17/580,831

(22) Filed: Jan. 21, 2022

(65) Prior Publication Data

US 2022/0150176 A1 May 12, 2022

Related U.S. Application Data

(63) Continuation of application No. PCT/CN2020/102873, filed on Jul. 17, 2020.

(30) Foreign Application Priority Data

Jul. 23, 2019 (CN) .......................... 201910668100.4

(51) Int. Cl.
  *H04L 47/28* (2022.01)
  *H04L 45/50* (2022.01)
  *H04L 47/12* (2022.01)

(52) U.S. Cl.
  CPC .............. *H04L 47/28* (2013.01); *H04L 45/50* (2013.01); *H04L 47/12* (2013.01)

(58) Field of Classification Search
  CPC ... H04L 1/0006; H04L 1/0015; H04L 1/0018; H04L 1/0033; H04L 45/50; H04L 47/12; H04L 47/28; H04L 47/30; H04L 47/34; H04L 47/36
  See application file for complete search history.

(56) References Cited

U.S. PATENT DOCUMENTS

| 6,496,481 | B1 | 12/2002 | Wu et al. |
| 11,552,878 | B1* | 1/2023 | Sharma ................ H04L 63/0471 |
| 11,706,149 | B2* | 7/2023 | Geng ...................... H04L 47/28 |
| | | | 370/235 |

(Continued)

FOREIGN PATENT DOCUMENTS

| CN | 101640594 A | 2/2010 |
| CN | 101855841 A | 10/2010 |

(Continued)

*Primary Examiner* — Wutchung Chu
(74) *Attorney, Agent, or Firm* — Maier & Maier, PLLC

(57) ABSTRACT

A packet transmission method and apparatus, and a system. The method includes: after receiving a first packet, a first device determines, based on a condition met by a first number carried in the first packet, a manner of sending the first packet. When the first number of the first packet meets a first condition, a second device determines a second cycle label corresponding to a first cycle label and sends the first packet to a third device in a cycle corresponding to the second cycle label. When the first number of the first packet meets a second condition, the second device determines a third cycle label corresponding to the first cycle label and sends the first packet to the third device in a cycle corresponding to the third cycle label.

15 Claims, 25 Drawing Sheets

(56) References Cited

U.S. PATENT DOCUMENTS

| | | | |
|---|---|---|---|
| 2002/0075886 A1* | 6/2002 | Tagore-Brage | H04L 12/43 370/403 |
| 2002/0181467 A1* | 12/2002 | Mueller | H04L 47/10 370/468 |
| 2003/0043764 A1* | 3/2003 | Kim | H04L 1/1896 370/329 |
| 2004/0027991 A1* | 2/2004 | Jang | H04L 47/10 370/230 |
| 2009/0143024 A1* | 6/2009 | Tocze | H04B 17/26 455/77 |
| 2011/0091211 A1 | 4/2011 | Kazawa et al. | |
| 2013/0016640 A1* | 1/2013 | Fang | H04W 52/0229 370/311 |
| 2021/0064432 A1* | 3/2021 | Benmakrelouf | G06N 3/126 |

FOREIGN PATENT DOCUMENTS

| | | |
|---|---|---|
| CN | 103297291 A | 9/2013 |
| CN | 104221424 B | 8/2018 |
| CN | 108738080 A | 11/2018 |
| EP | 2249528 A1 | 11/2010 |

\* cited by examiner

PACKET TRANSMISSION METHOD AND APPARATUS, AND SYSTEM

CROSS-REFERENCE TO RELATED APPLICATION

This application is a continuation of International Application No. PCT/CN2020/102873, filed on Jul. 17, 2020, which claims priority to Chinese Patent Application No. 201910668100.4, filed on Jul. 23, 2019. The disclosures of the aforementioned applications are hereby incorporated by reference in their entireties.

TECHNICAL FIELD

The embodiments relate to the field of communication technologies, and in particular, to a packet transmission method and apparatus, and a system.

BACKGROUND

Deterministic networks are currently hot topics in the industry. Demands for the deterministic networks come from industrial internet, smart factories, remote deployment and cloudification of programmable logic controller (PLC), and the like, and also come from remote real-time services such as real-time interaction, remote surgery, and tactile internet in augmented reality (AR) or in virtual reality (VR). A core of the deterministic networks is to ensure an end-to-end bandwidth, a delay, and a jitter of a service flow. Deterministic transmission means that a delay and jitter experienced during packet transmission need to meet a preset upper bound in a case of burst packets.

On the deterministic network, there is a mapping relationship between a cycle of an upstream device and a cycle of a downstream device. Because a length of a cycle of an egress interface of the upstream device is the same as a length of a cycle of an egress interface of the downstream device, a delay and a jitter experienced during packet transmission always meet the preset upper bound.

However, in some applications, the cycle length of the egress interface of the upstream device may be different from the cycle length of the egress interface of the downstream device. When the cycle length of the egress interface of the upstream device is less than the cycle length of the egress interface of the downstream device, the delay increases infinitely with cumulative time drift, which may cause continuous congestion when the downstream device sends a packet.

SUMMARY

The embodiments provide a packet transmission method and apparatus, and a system, to resolve a congestion problem during packet sending.

According to a first aspect, the embodiments provide a packet transmission method. The method includes: a second device receives at least one first packet from a first device. The first packet includes a first cycle label and a first number, and the first packet is a packet sent by the first device in a cycle corresponding to the first cycle label. When the first number of the first packet meets a first condition, the second device determines a second cycle label corresponding to the first cycle label and sends the first packet to a third device in a cycle corresponding to the second cycle label. When the first number of the first packet meets a second condition, the second device determines a third cycle label corresponding to the first cycle label and sends the first packet to the third device in a cycle corresponding to the third cycle label. The cycle corresponding to the second cycle label and the cycle corresponding to the third cycle label are different cycles. According to this solution, after receiving the first packet, the first device determines, based on a condition met by the first number carried in the first packet, a manner of sending the first packet. When the first number of the first packet meets the first condition, the second device determines the second cycle label corresponding to the first cycle label and sends the first packet to the third device in the cycle corresponding to the second cycle label. When the first number of the first packet meets the second condition, the second device determines the third cycle label corresponding to the first cycle label and sends the first packet to the third device in the cycle corresponding to the third cycle label. This method may eliminate a problem of an increasing delay caused by continuous cumulative drift due to clock errors and help avoid a congestion problem caused by a delay when the second device sends a packet. In addition, this cycle-based deterministic sending technology does not depend on time synchronization, and may update a cycle mapping relationship caused by time drift between different devices while ensuring no packet loss.

In a possible implementation, before the second device sends the first packet to a third device in a cycle corresponding to the second cycle label, the second device updates the first cycle label included in the first packet to the second cycle label.

Before the second device sends the first packet to the third device in the cycle corresponding to the third cycle label, the second device updates the first cycle label included in the first packet to the third cycle label.

In a possible implementation, if determining that the first number belongs to a first set, the second device determines that the first number of the first packet meets the first condition; and if determining that the first number does not belong to the first set, the second device determines that the first number of the first packet meets the second condition. The first set is used to indicate a cycle mapping manner. Alternatively, it may be understood that the first set is used to determine the cycle mapping manner.

In a possible implementation, the first number is one of N numbers starting from a start number, the N numbers correspond to N cycles, and N is a positive integer. If the second device does not receive a packet carrying the start number after an update condition of a cycle mapping relationship is met and before the first packet is received, the first set is an empty set. Alternatively, the first set includes L consecutive numbers starting from the start number in the N numbers. When a quantity of cycles between a cycle in which the first packet is located and a target cycle is less than N, L is equal to the quantity of cycles between the cycle in which the first packet is located and the target cycle plus 1; or when a quantity of cycles between a cycle in which the first packet is located and a target cycle is greater than or equal to N, L is equal to N, the target cycle is a cycle in which a packet carrying the start number appears for a first time on the first device after an update condition of a cycle mapping relationship is met. The cycle in which the first packet is located is not earlier than the target cycle.

In a possible implementation, the first number is one of N numbers starting from a start number, the N numbers correspond to N cycles, and N is a positive integer. The first set includes P consecutive numbers starting from the start number in the N numbers, and P is equal to a quantity of cycles between a cycle in which the first packet is located and a first cycle after a cycle update condition is met plus 1.

In a possible implementation, the first packet sent to the third device in the cycle corresponding to the second cycle label further includes the first number or a preset number; and the first packet sent to the third device in the cycle corresponding to the third cycle label further includes the first number.

In a possible implementation, before the second device receives the at least one first packet from the first device, the second device determines that the update condition of the cycle mapping relationship is met.

In a possible implementation, that the second device determines that the update condition of the cycle mapping relationship is met includes: if a first cycle of the second device after a latest moment at which a packet in a current cycle of an egress interface of the first device arrives at an egress interface of the second device, is earlier than a cycle of the second device that corresponds to the current cycle in an old cycle mapping relationship, the second device determines that the update condition of the cycle mapping relationship is met.

According to a second aspect, the embodiments provide a packet transmission method. The method includes: a first device obtains at least one packet of a first data flow. A sum of sizes of the at least one packet does not exceed a maximum sending quantity of the first data flows in one cycle of the first device. The first device sends at least one packet to a second device in a cycle corresponding to a first cycle label. Each packet in the at least one packet sent to the second device carries the first cycle label and a first number.

In a possible implementation, if a current cycle of the first device is a sending cycle corresponding to the first data flow, the cycle corresponding to the first cycle label is the current cycle; and if the current cycle of the first device is an idle cycle corresponding to the first data flow, the cycle corresponding to the first cycle label is a first sending cycle after the current cycle.

In a possible implementation, in cycles corresponding to the first device, there are K idle cycles after every N consecutive sending cycles, the first number is one of N numbers starting from a start number, the N numbers correspond to N consecutive sending cycles, N is a positive integer, and K is a positive integer not greater than N.

According to a third aspect, the embodiments provide a packet transmission method. The method includes: a gateway device obtains at least one packet of a first data flow. A sum of sizes of the at least one packet does not exceed a maximum sending quantity of the first data flows in one cycle of the gateway device. If a current cycle of the gateway device is a sending cycle corresponding to the first data flow, the gateway device sends a first packet in the sending cycle. If the current cycle of the gateway device is an idle cycle corresponding to the first data flow, the gateway device sends the first packet in a first sending cycle after the idle cycle. In cycles corresponding to the gateway device, there are K idle cycles after every N consecutive sending cycles, N is a positive integer, and K is a positive integer not greater than N.

In a possible implementation, the first packet sent in the sending cycle further includes a first number and a cycle label corresponding to the sending cycle, the first number is one of N numbers starting from a start number, the N numbers correspond to N consecutive sending cycles, and N is a positive integer.

According to a fourth aspect, the embodiments provide a packet transmission apparatus. The apparatus may be a second device or may be a chip used in the second device. The apparatus has a function of implementing the first aspect or the embodiments of the first aspect. The function may be implemented by hardware or may be implemented by hardware executing corresponding software. The hardware or the software includes one or more modules corresponding to the function.

According to a fifth aspect, the embodiments provide a packet transmission apparatus. The apparatus may be a first device or may be a chip used in the first device. The apparatus has a function of implementing the second aspect or the embodiments of the second aspect. The function may be implemented by hardware or may be implemented by hardware executing corresponding software. The hardware or the software includes one or more modules corresponding to the function.

According to a sixth aspect, the embodiments provide a packet transmission apparatus. The apparatus may be a gateway device or may be a chip used in the gateway device. The apparatus has a function of implementing the embodiments of the third aspect or the embodiments of the third aspect. The function may be implemented by hardware or may be implemented by hardware executing corresponding software. The hardware or the software includes one or more modules corresponding to the function.

According to a seventh aspect, the embodiments provide a packet transmission apparatus, including a processor and a memory. The memory is configured to store computer-executable instructions, and when the apparatus runs, the processor executes the computer-executable instructions stored in the memory, to enable the apparatus to perform the methods in the foregoing aspects.

According to an eighth aspect, the embodiments provide a packet transmission apparatus, including units or means configured to perform the steps in the foregoing aspects.

According to a ninth aspect, the embodiments provide a packet transmission apparatus, including a processor and an interface circuit. The processor is configured to communicate with another apparatus by using the interface circuit and perform the methods in the foregoing aspects. There are one or more processors, depending on the embodiment or implementation.

According to a tenth aspect, the embodiments provide a packet transmission apparatus including a processor. The processor is configured to be connected to a memory and invoke a program stored in the memory, to perform the methods in the foregoing aspects. The memory may be located inside the apparatus or may be located outside the apparatus. In addition, there are one or more processors, depending on the embodiment or implementation.

According to an eleventh aspect, the embodiments further provide a computer-readable storage medium. The computer-readable storage medium stores instructions. When the instructions are run on a computer, a processor is enabled to perform the methods according to the foregoing aspects.

According to a twelfth aspect, the embodiments further provide a computer program product including instructions. When the computer program product runs on a computer, the computer is enabled to perform the methods in the foregoing aspects.

According to a thirteenth aspect, the embodiments further provide a chip system, including a processor. The processor is configured to perform the methods in the foregoing aspects.

According to a fourteenth aspect, the embodiments further provide a packet transmission system, including the second device configured to perform any method in the first aspect and the first device configured to perform any method in the second aspect.

DETAILED DESCRIPTION OF THE EMBODIMENTS

To make objectives, solutions, and advantages of the embodiments more clear, the following further describes the embodiments in detail with reference to the accompanying drawings. A specific operation method in a method embodiment may also be applied to an apparatus embodiment or a system embodiment. In the descriptions, unless otherwise specified, "a plurality of" means two or more than two.

Figure 1:
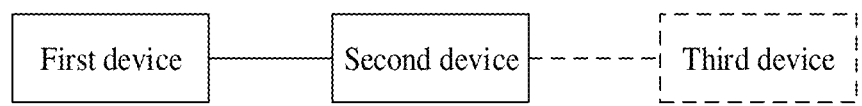
FIG. 1 is a schematic diagram of a possible network architecture.

FIG. 1 shows a network architecture applicable to the embodiments. The network architecture includes a first device and a second device. Optionally, the network architecture may further include a third device. The second device may receive a packet from the first device and send the received packet to the third device. The first device may be a routing device (route), a gateway device (gateway), or the like. The second device may be a gateway device, a routing device, or the like. The third device may be a routing device, a gateway device, or the like.

Any two devices in an upstream-downstream relationship may be referred to as an upstream device and a downstream device respectively. For example, the first device may be referred to as an upstream device, and the second device may be referred to as a downstream device. For another example, the second device may be referred to as an upstream device, and the third device may be referred to as a downstream device.

Figure 2:
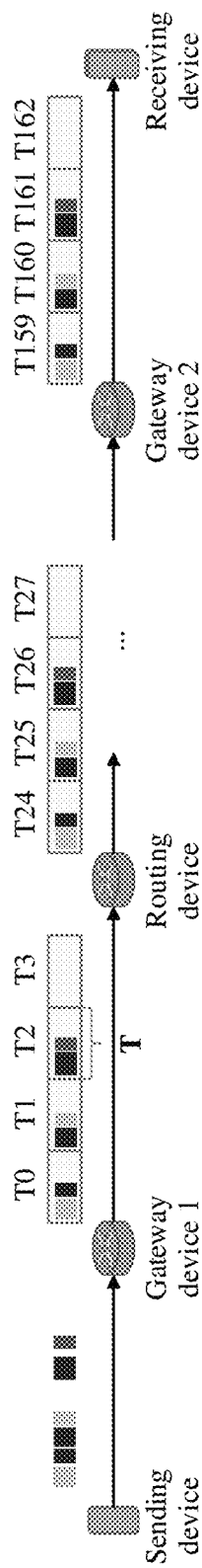
FIG. 2 is an example diagram of a cycle-based deterministic sending method.

FIG. 2 is an example diagram of a cycle-based deterministic sending method. Devices shown in FIG. 2 include a sending device (sender), a gateway device (a gateway device 1 and a gateway device 2 shown in FIG. 2), and one or more routing devices and receiving devices (receiver). These devices support cycle label switching and may run clocks independently.

When there is only one routing device in FIG. 2, the gateway device 1, the routing device, and the gateway device 2 in FIG. 2 may be respectively the first device, the second device, and the third device in FIG. 1.

Alternatively, when there are two routing devices in FIG. 2, the gateway device 1, a first routing device, and a second routing device in FIG. 2 may be respectively the first device, the second device, and the third device in FIG. 1, or a first routing device, a second routing device, and the gateway device 2 in FIG. 2 may be respectively the first device, the second device, and the third device in FIG. 1.

A case of three or more routing devices is deduced by analogy, and details are not described again.

Referring now to FIG. 2, time axes of egress interfaces of all devices in the conventional technology (for example, the sending device, the gateway device 1, the routing device, and the gateway device 2) are divided into cycles whose lengths are T. In other words, egress interfaces of all devices on a deterministic sending network have a same cycle, and the network is a synchronous network.

Figure 3:
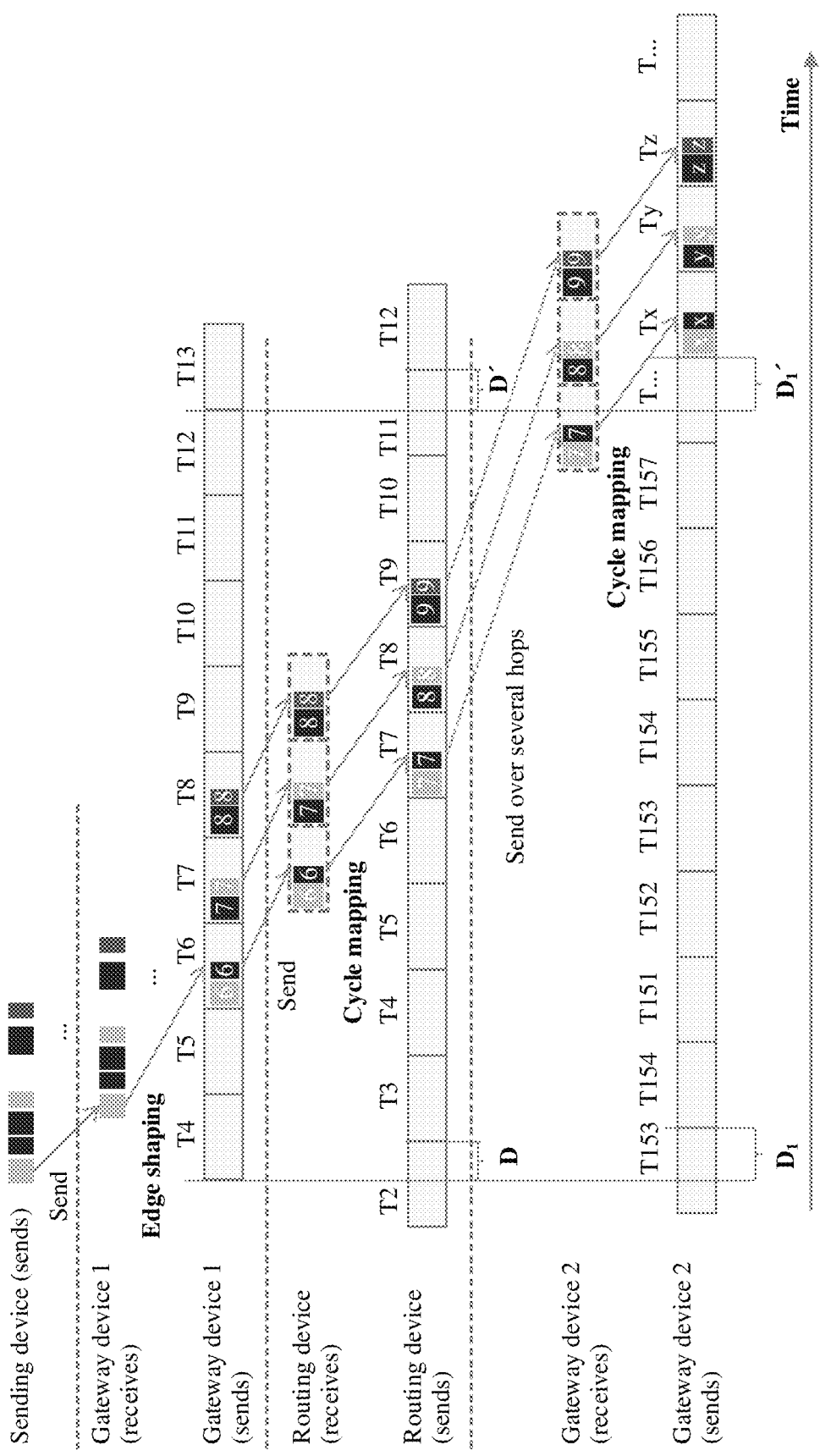
FIG. 3 is a schematic diagram of a cycle boundary relationship between devices.

For any two adjacent devices (that is, two devices in an upstream-downstream relationship), distances between boundaries of close cycles of the two devices may remain unchanged (at microsecond (μs)-level precision), that is, $|D'-D| \leq 1$ μs at any two positions on a time axis. FIG. 3 is a schematic diagram of a cycle boundary relationship between devices. The following key points are included.

(1) Edge shaping: A gateway device 1 shapes received traffic and sends the traffic in a manner in which a quantity of bytes per T cycle of each flow does not exceed Bi*T, where Bi represents bandwidth specified by a service-level agreement (SLA) of each flow.

(2) Cycle label: For example, the cycle label may be a cycle of 0 to 3, and a packet sent in a cycle carries a cycle label corresponding to the current cycle. As shown in FIG. 3, there are a plurality of cycles at an egress interface of the gateway device 1. Packets sent in a T6 cycle all carry a cycle label 6, packets sent in a T7 cycle all carry a cycle label 7, packets sent in a T8 cycle all carry a cycle label 8, and the like.

(3) Mapping relationship between cycles: For two adjacent devices on a network, a fixed mapping relationship is established between a cycle of an egress interface of an upstream device and a cycle of an egress interface of a downstream device: X is mapped to X+ delta (delta is a constant). For example, after a packet in a cycle X of the egress interface of the upstream device is sent to the downstream device, the packet is sent in a cycle X+ delta of the egress interface of the downstream device. As shown in FIG. 3, a cycle T6 of an egress interface of the gateway device 1 is mapped to a cycle T7 of an egress interface of a routing device, delta is equal to 1, and subsequent cycles also follow the mapping relationship. Therefore, a cycle T7 of the egress interface of the gateway device 1 is mapped to a cycle T8 of the egress interface of the routing device, a cycle T8 of the egress interface of the gateway device 1 is mapped to a cycle T9 of the egress interface of the routing device, and so on.

A cycle mapping relationship may be represented by a mapping relationship between cycle labels.

(4) Cyclic sending: For one egress interface of a device (for example, the sending device, the gateway device 1, the routing device, and the gateway device 2 in FIG. 2), each cycle of the egress interface has a queue. A queue index is a cycle label. The queue is enabled only in this cycle and is disabled in other cycles. A packet sent in this cycle enters a queue based on a mapped cycle label.

The foregoing solution utilizes devices supporting 1588v2 deployed on an entire network. For example, egress interfaces of all the devices on the network have a same cycle. FIG. 2 is used as an example. A cycle of the egress interface of the sending device, a cycle of the egress interface of the gateway device 1, a cycle of the egress interface of the routing device, and a cycle of the egress interface of the gateway device 2 are all the same. However, in a subsequent embodiment, customers require that deterministic sending do not depend on 1588v2. For example, egress interfaces of different devices may have different cycles, and the different devices are on an asynchronous network.

If the devices supporting 1588v2 are not deployed, regardless of whether a local crystal oscillator is used to determine a cycle length of each device or a frequency synchronization technology is configured on the entire network, there may be errors in cycle lengths of different devices. After a period of time, some problems may occur. The following describes different cases.

Case 1: A cycle length of an upstream device is greater than a cycle length of a downstream device.

On a condition that a mapping relationship between a cycle of the upstream device and a cycle of the downstream device remains unchanged, as time drift accumulates, a packet on an egress interface of the upstream device may arrive at an egress interface of the downstream device too late and miss a corresponding sending cycle of the downstream device in the mapping relationship. In essence, a sending rate of the upstream device is lower than a sending rate of the downstream device.

For this case, a possible solution is as follows: after detecting that the mapping relationship needs to be updated, the downstream device may directly update the mapping relationship between the cycle of the upstream device and the cycle of the downstream device. In this way, when a packet of the egress interface of the upstream device arrives at the egress interface of the downstream device too late, the downstream device skips one sending cycle and sends the packet in a next cycle of the downstream device.

Figure 4:
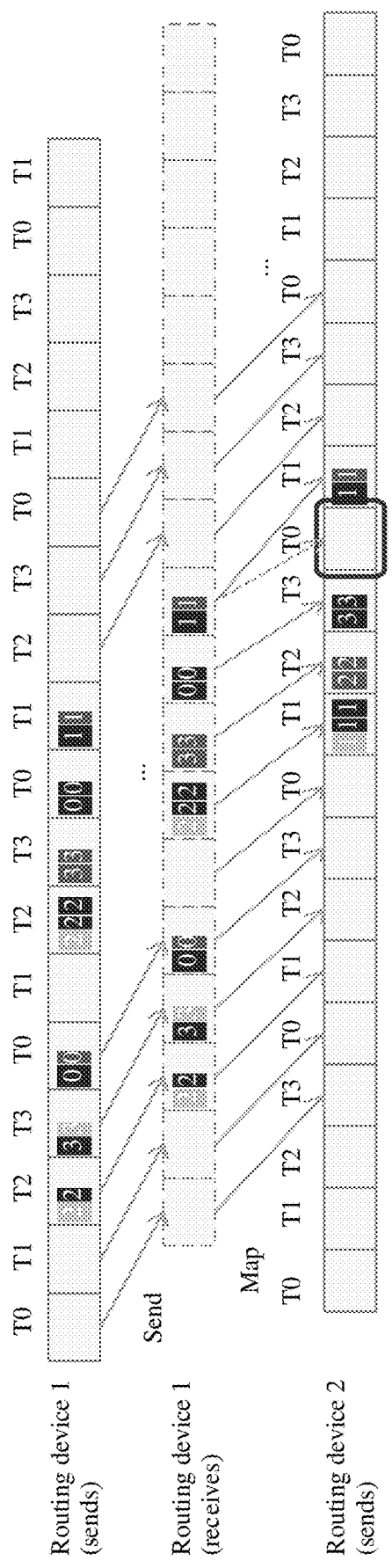
FIG. 4 is an example in which a cycle length of an upstream device is greater than a cycle length of a downstream device.

FIG. 4 is an example in which the cycle length of the upstream device is greater than the cycle length of the downstream device. For example, a label cycle of a cycle label is 0 to 3. A mapping relationship between a cycle of a routing device 1 and a cycle of a routing device 2 is: T0 is mapped to T3, T1 is mapped to T0, T2 is mapped to T1, and T3 is mapped to T2. It can be understood that a packet in the cycle T1 of the routing device 1 arrives at the routing device 2 too late and misses the corresponding sending cycle T0 of the routing device 2. Therefore, the mapping relationship is updated to be: T0 is mapped to T0, T1 is mapped to T1, T2 is mapped to T2, and T3 is mapped to T3. In addition, the late packet is sent in the corresponding cycle T1 in a new cycle mapping relationship.

Case 2: A cycle length of an upstream device is less than a cycle length of a downstream device.

On the condition that a mapping relationship between a cycle of the upstream device and a cycle of the downstream device remains unchanged, as time drift accumulates, a delay infinitely increases (a natural number queue) or a greedy snake problem (a finite number queue) occurs, which causes continuous congestion. In essence, a sending rate of the upstream device is greater than a sending rate of the downstream device.

For this case, after detecting that the mapping relationship between the two cycles needs to be updated, the downstream device cannot directly update the mapping relationship between the cycle of the upstream device and the cycle of the downstream device. Because if the cycle mapping relationship is directly updated, a to-be-sent packet in a current cycle may exceed a sending capability of the cycle.

Figure 5:
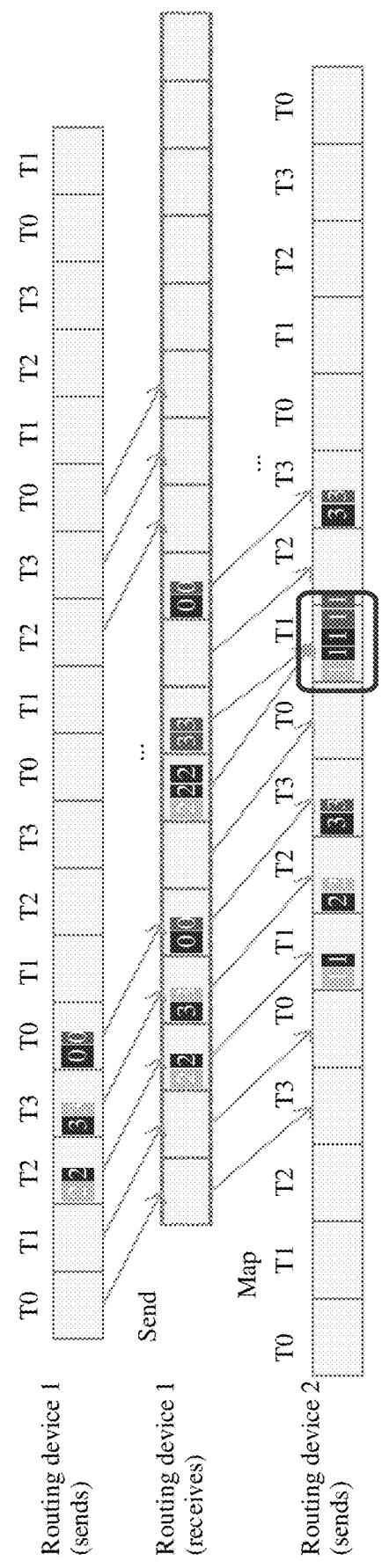
FIG. 5 is an example in which a cycle length of an upstream device is less than a cycle length of a downstream device.

FIG. 5 is an example in which the cycle length of the upstream device is less than the cycle length of the downstream device. For example, a label cycle of a cycle is 0 to 3. A mapping relationship between a cycle of a routing device 1 and a cycle of a routing device 2 is: T0 is mapped to T3, T1 is mapped to T0, T2 is mapped to T1, and T3 is mapped to T2. It can be understood that if a packet in the cycle T3 of the routing device 1 is sent in advance, that is, the packet in the cycle T3 and a packet in the cycle T2 of the routing device 1 are sent together. Here, according to the cycle mapping relationship, the cycle T2 of the routing device 1 is mapped to the cycle T1 of the routing device 2. Therefore, a large quantity of packets are sent in the cycle T1 of the routing device 2. If the quantity of packets exceeds a packet sending capability of the routing device 2 in one cycle, a packet may be lost.

For the case 2, how to implement deterministic sending of a packet, to resolve continuous cumulative drift due to clock errors of different devices is a problem to be resolved.

The following describes a packet transmission method. Refer to the architecture shown in FIG. 1. Key points of the method include the following.

(1) A length of a cycle of an egress interface of a first device is less than a length of a cycle of an egress interface of a second device.

(2) If the first device is a gateway device (for example, the gateway device 1 in FIG. 2) that has an upstream-downstream relationship with a sending device, when sending a packet, the gateway device does not send a packet in K idle cycles after every N consecutive cycles. N is a positive integer, and K is a positive integer not greater than N. For example, there are K idle cycles after every N consecutive sending cycles. The sending cycle is a cycle used for sending a packet (a packet may be sent or may not be sent in the sending cycle). The idle cycle is a cycle not used for sending a packet.

The gateway device may send a packet on a per-flow basis. For example, the gateway device receives a first data flow sent by the sending device and forwards the first data flow. Even cycles are divided for an egress interface through which the gateway device forwards the first data flow, and an upper limit of a quantity of bytes of the first data flow sent in each cycle is specified. For example, the gateway device obtains at least one packet of the first data flow. A sum of sizes of the at least one packet does not exceed a maximum sending quantity of the first data flows in one cycle of the gateway device. If a current cycle of the gateway device is a sending cycle corresponding to the first data flow, the gateway device sends a first packet in the sending cycle. If the current cycle of the gateway device is an idle cycle corresponding to the first data flow, the gateway device sends the first packet in a first sending cycle after the idle cycle.

Further, the first packet sent in the sending cycle further includes a first number and a cycle label corresponding to the sending cycle. The first number is one of N numbers starting from a start number, and the N numbers correspond to N sending cycles. For example, if the start number is 0, the N numbers may be 0 to N−1. The N numbers may alternatively be inconsecutive. This is not limited.

Figure 6:
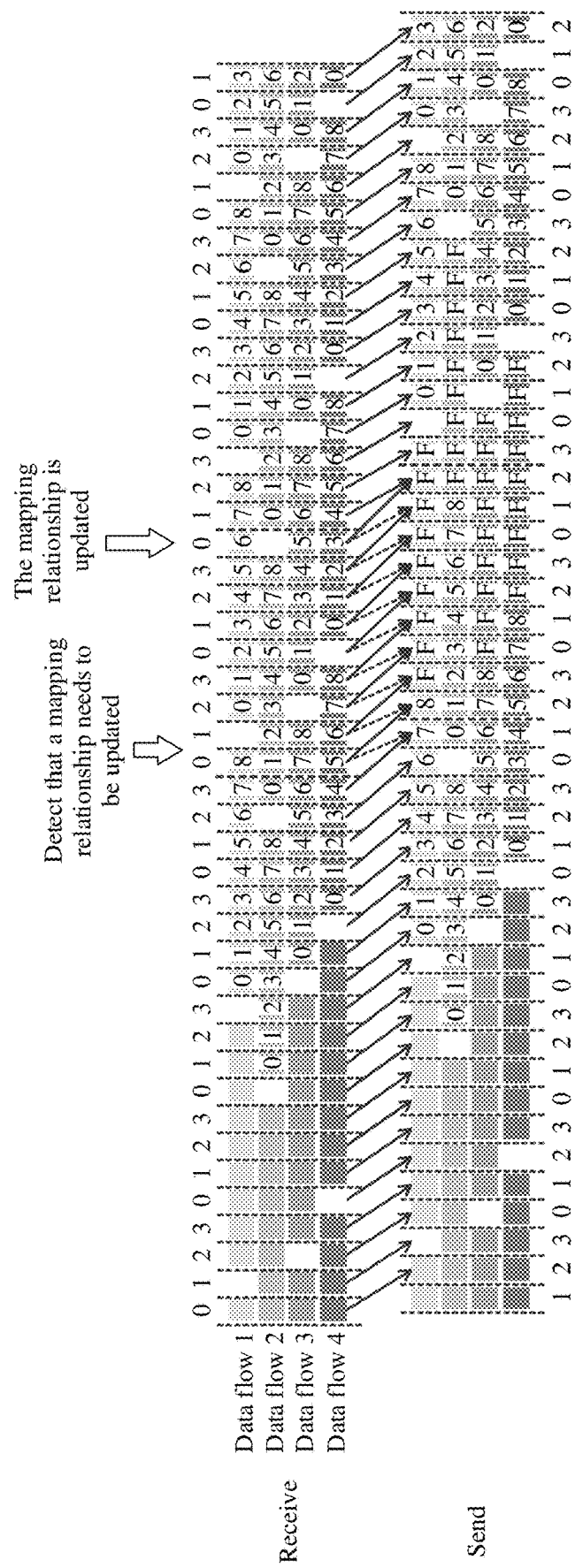
FIG. 6 is an example diagram of a packet transmission method.

FIG. 6 is an example diagram of a packet transmission method. A packet is not sent in K (for example, K=1 in FIG. 6) idle cycles every N (for example, N=9 in FIG. 6) cycles. Each cycle has a number, and numbers corresponding to every N consecutive cycles are sequentially 0 to N−1. In other words, the N consecutive cycles in which a packet needs to be sent are sequentially numbered 0 to N−1, may also be sequentially numbered 1 to N, or may be in another numbering manner.

As shown in FIG. 6, sending cycles are sequentially numbered from 0 to 8, and are cyclically repeated based on numbers from 0 to 8. A numbered cycle is a sending cycle and is used for sending a packet. A cycle without a number is an idle cycle, and a packet is not sent in the idle cycle.

In this embodiment, each packet needs to carry a number and a cycle label. The cycle label is used to indicate a cycle in which the packet needs to be sent. The number is used to indicate whether a cycle mapping relationship (or referred to as a cycle label mapping relationship) needs to be updated.

(3) In one cycle, packets of one or more data flows may be sent.

FIG. 6 is used as an example. Packets of four data flows may be sent in a cycle, and packets sent in a same cycle carry a same cycle label regardless of a data flow to which the packet belongs. For example, refer to FIG. 6. All packets in a cycle corresponding to a cycle label 0 carry a cycle label 0, but the packets in the cycle may carry different numbers, which are respectively one of 0 to 8.

(4) There is a cycle mapping relationship between the cycle of the first device (including the foregoing gateway device 1) and the cycle of the second device.

In this embodiment, the mapping relationship before updating is referred to as an old cycle mapping relationship, and the updated cycle mapping relationship is referred to as a new cycle mapping relationship. In addition, a cycle corresponding to the cycle of the first device in the new cycle mapping relationship is K cycles earlier than a cycle corresponding to the cycle of the first device in the old cycle mapping relationship.

For example, refer to FIG. 6. A cycle label carried in a packet in a previous cycle at a position of a first arrow is 0, a cycle label of the cycle of the second device corresponding to the old cycle mapping relationship is 2 (shown by a solid line in FIG. 6), and a cycle label of the cycle of the second device corresponding to the new cycle mapping relationship is 1 (shown by a dashed line in FIG. 6).

(5) A method for determining, by the second device, that an update condition of the cycle mapping relationship is met includes but is not limited to the following three implementations.

Implementation 1: If a first cycle of the second device after a first target moment is earlier than a cycle of the second device corresponding to a current cycle of the egress interface of the first device in the old cycle mapping relationship, the second device determines that the update condition of the cycle mapping relationship is met. The first target moment is a latest moment at which a packet in the current cycle of the egress interface of the first device arrives at an ingress interface of the second device plus a moment at which a maximum value of an internal processing delay of the second device is located.

In an implementation, the first target moment is denoted as $t1$, the latest moment at which the packet in the current cycle of the egress interface of the first device arrives at the ingress interface of the second device is denoted as $t2$, and the maximum value of the internal processing delay of the second device is denoted as D. $t1=t2+D$, and $t2=t3+T$. $t3$ is a moment at which a first bit of a first packet in the current cycle of the egress interface of the first device arrives at the ingress interface of the second device, and T is a length of a cycle in which the first device sends the packet.

Implementation 2: If a first cycle of the second device after a second target moment is earlier than a cycle of the second device corresponding to a current cycle of the egress interface of the first device in the old cycle mapping relationship, the second device determines that the update condition of the cycle mapping relationship is met. The second target moment is a latest moment at which a packet in the current cycle of the egress interface of the first device arrives at an ingress interface of the second device plus a moment at which a maximum value of an internal processing delay of the second device is located and a link jitter between the first device and the second device.

In an implementation, the second target moment is denoted as $t4$, the latest moment at which the packet in the current cycle of the egress interface of the first device arrives at the ingress interface of the second device is denoted as $t2$, the maximum value of the internal processing delay of the second device is denoted as D, and the link jitter between the first device and the second device is denoted as jitter 1. $t4=t2+D+$ jitter 1, and $t2=t3+T$. $t3$ is a moment at which a first bit of a first packet in the current cycle of the egress interface of the first device arrives at the ingress interface of the second device, and T is a length of a cycle in which the first device sends the packet.

Implementation 3: If a first cycle of the second device after a latest moment at which a packet in a current cycle of the egress interface of the first device arrives at the egress interface of the second device, is earlier than a cycle of the second device corresponding to the current cycle of the egress interface of the first device in the old cycle mapping relationship, the second device determines that the update condition of the cycle mapping relationship is met.

In an implementation, the latest moment at which the packet in the current cycle of the egress interface of the first device arrives at the egress interface of the second device is denoted as t5. t5=t6+T. t6 is a moment at which a first bit of a first packet in the current cycle of the egress interface of the first device arrives at the egress interface of the second device, and T is a length of a cycle in which the first device sends the packet.

In still another implementation, the latest moment at which the packet in the current cycle of the egress interface of the first device arrives at the egress interface of the second device is denoted as t7. t7=t6+T+ jitter 2. t6 is the moment at which the first bit of the first packet in the current cycle of the egress interface of the first device arrives at the egress interface of the second device, T is the length of the cycle in which the first device sends the packet, and jitter 2 is a jitter between the egress interface of the first device and the egress interface of the second device. Optionally, the jitter between the egress interface of the first device and the egress interface of the second device is a link jitter between the first device and the second device plus an internal jitter of the second device.

Figure 7:
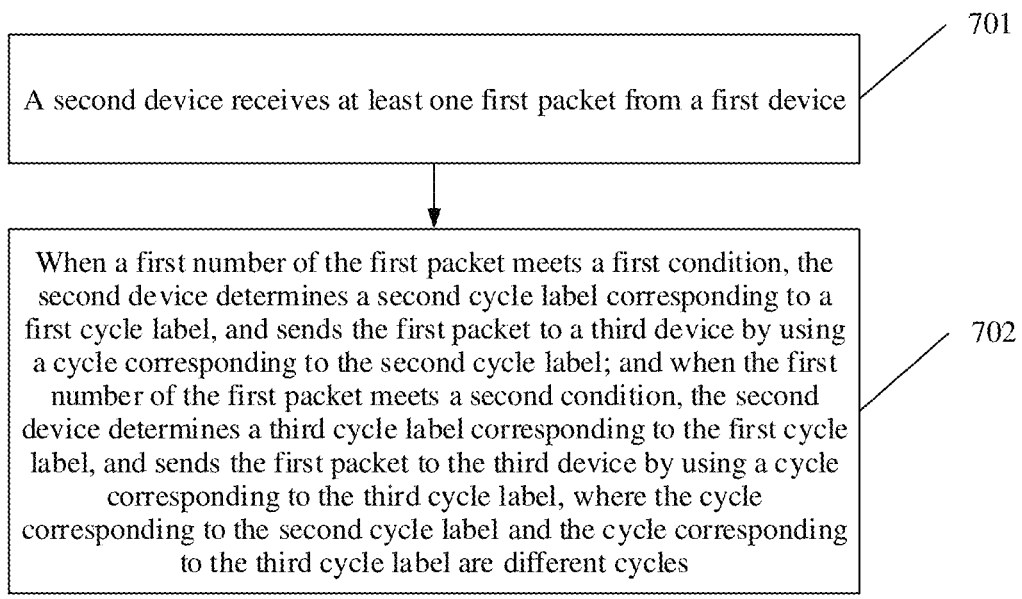
FIG. 7 is a schematic flowchart of a packet transmission method.

The following describes a packet transmission method provided in the embodiments. As shown in FIG. 7, the method includes the following steps.

Step 701: A second device receives at least one first packet from a first device, where the first packet includes a first cycle label and a first number, and the first packet is a packet sent by the first device in a cycle corresponding to the first cycle label.

It should be noted that, if the first device herein is the gateway device 1 shown in FIG. 2, for a packet sent by the gateway device 1, refer to the foregoing description. Details are not described herein again.

If the first device herein is another device other than the gateway device 1, for example, the routing device or the gateway device 2 shown in FIG. 2, the first device may send a packet on a per-flow basis. For example, the first device obtains at least one packet of a first data flow. A sum of sizes of the at least one packet does not exceed a maximum sending quantity of the first data flows in one cycle of the first device. Then, the first device sends the at least one packet to the second device in the cycle corresponding to the first cycle label. Each packet in the at least one packet sent to the second device carries the first cycle label and the first number. In cycles corresponding to the first device, there are K idle cycles after every N consecutive sending cycles. The sending cycle is used for sending a packet, and the idle cycle is not used for sending a packet.

The first number is one of N numbers starting from a start number, the N numbers correspond to N consecutive sending cycles, N is a positive integer, and K is a positive integer not greater than N. For example, refer to FIG. 6. N=9, K=1, the first number may be one of 0 to 8, and the first cycle label may be one of 0 to 3.

The first number is used to indicate a position relationship between an idle cycle before a current cycle and the current cycle. The current cycle refers to a cycle in which a packet carrying the first number is located, and the current cycle may also be referred to as a packet cycle, a first cycle, or the like.

An example in which N=9, K=1, and the first number is one of 0 to 8 is used. When the first number is 0, it indicates that one cycle before the current cycle is an idle cycle; and when the first number is 1, it indicates that a position of a length of two cycles before the current cycle is an idle cycle (that is, a cycle before the current cycle is a cycle in which a packet carrying a number 0 is located, and a cycle before the cycle in which the packet carrying the number 0 is located is an idle cycle). The rest may be deduced by analogy, and details are not described again.

Step 702: When the first number of the first packet meets a first condition, the second device determines a second cycle label corresponding to the first cycle label and sends the first packet to a third device in a cycle corresponding to the second cycle label.

When the first number of the first packet meets a second condition, the second device determines a third cycle label corresponding to the first cycle label and sends the first packet to the third device in a cycle corresponding to the third cycle label. The cycle corresponding to the second cycle label and the cycle corresponding to the third cycle label are different cycles.

According to the foregoing implementation, after receiving the first packet, the first device determines, based on a condition met by the first number carried in the first packet, a manner of sending the first packet. When the first number of the first packet meets the first condition, the second device determines the second cycle label corresponding to the first cycle label and sends the first packet to the third device in the cycle corresponding to the second cycle label. When the first number of the first packet meets the second condition, the second device determines the third cycle label corresponding to the first cycle label and sends the first packet to the third device in the cycle corresponding to the third cycle label. This method may eliminate a problem of an increasing delay caused by continuous cumulative drift due to clock errors and help avoid a congestion problem caused by a delay when the second device sends a packet. In addition, this cycle-based deterministic sending technology does not depend on time synchronization and may update a cycle mapping relationship caused by time drift between different devices while ensuring no packet loss.

In a possible implementation, before sending the first packet to the third device in the cycle corresponding to the second cycle label, the second device updates the first cycle label included in the first packet to the second cycle label. For example, a cycle label carried in the first packet sent by the second device to the third device in the cycle corresponding to the second cycle label is the second cycle label. For example, refer to FIG. 6. A position indicated by a second arrow is used as an example. Cycle labels (namely, the first cycle label) carried in packets in this cycle received by the second device are all 0. A packet of a data flow 1 carries a number 6, a packet of a data flow 3 carries a number 5, and a packet of a data flow 4 carries a number 3. When sending the packets in this cycle, the second device modifies all the cycle labels in the packets to 1 (namely, the second cycle label). The first cycle label and the second cycle label herein are mapping between cycle labels in a new cycle mapping relationship.

Before sending the first packet to the third device in the cycle corresponding to the third cycle label, the second device updates the first cycle label included in the first packet to the third cycle label. For example, a cycle label carried in the first packet sent by the second device to the third device in the cycle corresponding to the third cycle label is the third cycle label. For example, refer to FIG. 6. The position indicated by the second arrow is used as an example. Cycle labels (namely, the first cycle label) carried in packets in this cycle received by the second device are all 0. A packet of a data flow 1 carries a number 6, a packet of a data flow 3 carries a number 5, and a packet of a data flow 4 carries a number 3. When sending the packets in this cycle, the second device modifies all the cycle labels in the packets to 2 (namely, the third cycle label). The first cycle label and the third cycle label herein are mapping between cycle labels in an old cycle mapping relationship.

It should be noted that the second device uses only one of the foregoing two mapping relationships (namely, the new cycle mapping relationship and the old cycle mapping relationship), to determine a cycle in which a packet is sent and a corresponding cycle label.

In an implementation, in step 702, a condition met by the first number of the first packet may be determined by using the following method: If determining that the first number belongs to a first set, the second device determines that the first number of the first packet meets the first condition; and if determining that the first number does not belong to the first set, the second device determines that the first number of the first packet meets the second condition. The first set is used to indicate a cycle mapping manner.

In an implementation, a manner of determining the first set is as follows.

If the second device does not receive a packet carrying the start number after an update condition of a cycle mapping relationship is met and before the first packet is received, the first set is an empty set.

Alternatively, the first set includes L consecutive numbers starting from the start number in the N numbers. When a quantity of cycles between a cycle in which the first packet is located and a target cycle is less than N, L is equal to the quantity of cycles between the cycle in which the first packet is located and the target cycle plus 1; or when a quantity of cycles between a cycle in which the first packet is located and a target cycle is greater than or equal to N, L is equal to N, the target cycle is a cycle in which a packet carrying the start number appears for a first time on the first device after an update condition of a cycle mapping relationship is met, and the cycle in which the first packet is located is not earlier than the target cycle. For example, the start number is 0. When the quantity of cycles between the cycle in which the first packet is located and the target cycle is equal to 0, the first set is {0}; when the quantity of cycles between the cycle in which the first packet is located and the target cycle is equal to 1, the first set is {0, 1}; . . . ; when the quantity of cycles between the cycle in which the first packet is located and the target cycle is equal to N−1, the first set is {0, 1, 2, . . . , N−1}; and when the quantity of cycles between the cycle in which the first packet is located and the target cycle is greater than or equal to N, the first set is {0, 1, 2, . . . , N−1}.

In another implementation, a manner of determining the first set is as follows.

The first set includes P consecutive numbers starting from the start number in the N numbers, and P is equal to a quantity of cycles between a cycle in which the first packet is located and a first cycle after a cycle update condition is met plus 1. For example, the start number is 0. When the quantity of cycles between the cycle in which the first packet is located and the first cycle after the cycle update condition is met is equal to 0, the first set is {0}; when the quantity of cycles between the cycle in which the first packet is located and the first cycle after the cycle update condition is met is equal to 1, the first set is {0, 1}; . . . ; and when the quantity of cycles between the cycle in which the first packet is located and the first cycle after the cycle update condition is met is equal to N−1, the first set is {0, 1, 2, . . . , N−1}.

In the foregoing, the first set is used to indicate or determine the cycle mapping manner. Another manner may be used to indicate the cycle mapping manner, which is described below.

In an implementation, if determining that the first number belongs to the first set, the second device determines that the first number of the first packet meets the first condition. Further, the second device determines the second cycle label corresponding to the first cycle label and sends the first packet to the third device in the cycle corresponding to the second cycle label. If determining that the first number belongs to a second set, the second device determines that the first number of the first packet meets a second condition. The second device determines the third cycle label corresponding to the first cycle label and sends the first packet to the third device in the cycle corresponding to the third cycle label.

It should be noted that another set may be further included, for example, a third set, a fourth set, and a fifth set. Uses of the third set, the fourth set, the fifth set, and the like are different from those of the first set and the second set. For example, the third set is used to determine a lost packet, and the fourth set is used to determine a cycle in which the first packet is sent. The cycle is different from the cycle corresponding to the second cycle label and the cycle corresponding to the third cycle label.

In an implementation, the first packet sent to the third device in the cycle corresponding to the second cycle label further includes the first number or a preset number. The first packet sent to the third device in the cycle corresponding to the third cycle label further includes the first number. The preset number herein is any number different from the first number, provided that the preset number can be distinguished from the first number. For example, if the first number is one of 0 to N 1, the preset number is any symbol other than 0 to N−1.

In an implementation, when the first packet belongs to a number set, the first packet sent to the third device in the cycle corresponding to the second cycle label includes the preset number. The foregoing number set dynamically changes. For example, the N numbers are 0 to N−1, and a dynamic change process of the number set is as follows: empty set, {0}, {0, 1}, . . . {0, 1, . . . , X}, {1, . . . , X+1}, {2, . . . , X+2}, . . . , {N−X−1, . . . , N−2,N−1}, {N−X, . . . , N−2,N−1}, {N−X+2, . . . , N−2, N−1}, . . . , {N−2, N−1}, {N−1}, and empty set. X is an integer from 0 to N−1, and an $X^{th}$ cycle is a cycle in which all packets in the entire cycle are sent according to the new cycle mapping relationship for a first time.

In an implementation, before step 701, the second device determines that the update condition of the cycle mapping relationship is met. For example, when determining that the update condition of the cycle mapping relationship is met, the second device performs the packet transmission method shown in FIG. 2. For details about how the second device determines that the update condition of the cycle mapping relationship is met, refer to the foregoing description. Details are not described herein again.

The solution shown in FIG. 7 may be for one or more data flows. The following describes each step performed in the solution shown in FIG. 7. One cycle is idle (that is, K=1) after every N consecutive sending cycles of the first device, the preset number is represented by "F", the N numbers are 0 to N−1. An $M^{th}$ cycle after the update condition of the cycle mapping relationship is met is the target cycle (that is, a cycle in which a packet carrying a start number 0 appears for a first time on the first device after the update condition of the cycle mapping relationship is met).

During specific implementation, the method shown in FIG. 7 may be executed with reference to the following procedure.

Starting from a first cycle, the second device checks, cycle by cycle, whether a packet carrying a number 0 exists in a current cycle, until the packet carrying the number 0 is checked for a first time in an $M^{th}$ cycle. M is a positive integer less than or equal to N.

The second device modifies a number of the packet carrying the number 0 in the $M^{th}$ cycle to F, maps the packet to a corresponding cycle according to the new cycle mapping relationship for sending, and maps another packet in the $M^{th}$ cycle to a corresponding cycle according to the old cycle mapping relationship for sending.

The second device modifies a number of a packet carrying a number 0 or 1 in an $(M+1)^{th}$ cycle to F, maps the packet to a corresponding cycle according to the new cycle mapping relationship for sending, and maps another packet in the $(M+1)^{th}$ cycle to a corresponding cycle according to the old cycle mapping relationship for sending.

The second device modifies a number of a packet carrying a number 0, 1, or 2 in an $(M+2)^{th}$ cycle to F, maps the packet to a corresponding cycle according to the new cycle mapping relationship for sending, and maps another packet in the $(M+2)^{th}$ cycle to a corresponding cycle according to the old cycle mapping relationship for sending.

. . .

The second device modifies a number of a packet carrying a number 0, 1, 2, . . . , or X in an $(M+X)^{th}$ ($0 \leq X \leq N-1$) cycle to F, maps the packet to a corresponding cycle according to the new cycle mapping relationship for sending, and maps another packet in the $(M+X)^{th}$ cycle to a corresponding cycle according to the old cycle mapping relationship for sending, where X is an integer from 0 to N−1, and an $X^{th}$ cycle is a cycle in which all packets in the entire cycle are sent according to the new cycle mapping relationship for a first time.

The second device modifies a number of a packet carrying a number 1, 2, . . . , X, or X+1 in an $(M+X+1)^{th}$ cycle to F and maps the packet to a corresponding cycle according to the new cycle mapping relationship for sending.

The second device modifies a number of a packet carrying a number 2, . . . , X+1, or X+2 in an $(M+X+2)^{th}$ cycle to F and maps the packet to a corresponding cycle according to the new cycle mapping relationship for sending.

. . .

The second device modifies a number of a packet carrying a number N−X−1, . . . , N−2, or N−1 in an $(M+N-1)^{th}$ cycle to F and maps the packet to a corresponding cycle according to the new cycle mapping relationship for sending.

The second device modifies a number of a packet carrying a number N−X, . . . , N−2, or N−1 in an $(M+N)^{th}$ cycle to F and maps the packet to a corresponding cycle according to the new cycle mapping relationship for sending.

. . .

The second device modifies a number of a packet carrying a number N−1 in an $(M+N+X-1)^{th}$ cycle to F and maps the packet to a corresponding cycle according to the new cycle mapping relationship for sending.

It should be noted that, in the embodiments, a packet may not need to carry the preset number. If the packet does not carry the preset number, after up to N−1 cycles, all packets are definitely to be forwarded according to the new cycle mapping relationship.

The following describes the foregoing solutions with reference to a specific example. The first device sends packets of four data flows to the second device. The four data flows are denoted as a data flow 1, a data flow 2, a data flow 3, and a data flow 4. The preset number is denoted by F. FIG. 8 to FIG. 24 are schematic diagrams of packet sending in each cycle on a network.

Figure 8:
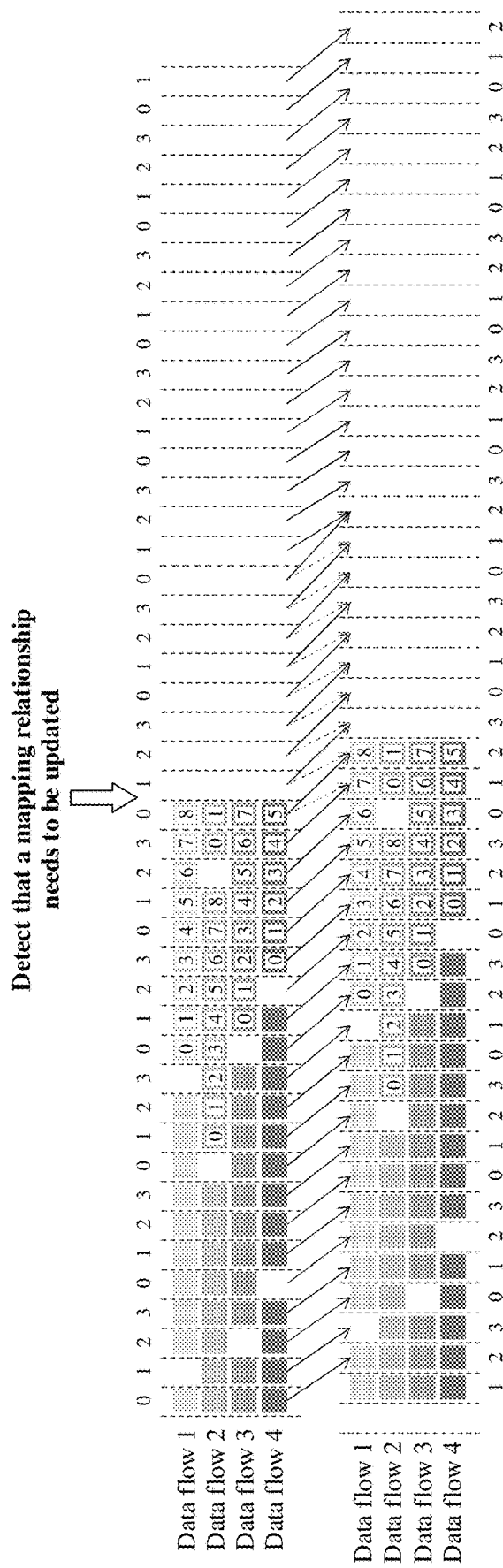
FIG. 8 is a schematic diagram of packet sending in a cycle.

As shown in FIG. 8, an upper part represents an ingress interface of a second device and shows a cycle of an egress interface of a previous-hop device. A lower part represents an egress interface of the second device and shows a cycle of the egress interface of the second device. A vertical dashed line represents a boundary of a cycle.

In a period of time after it is detected that a mapping relationship needs to be updated, both a new cycle mapping relationship (dashed arrow in FIG. 8) and an old cycle mapping relationship (solid arrow in FIG. 8) are maintained. After this cycle of time, only the solid arrow is left, indicating that the old cycle mapping relationship is deleted. In this case, the solid arrow indicates the new cycle mapping relationship.

The following shows steps of updating a cycle mapping relationship.

Figure 9:
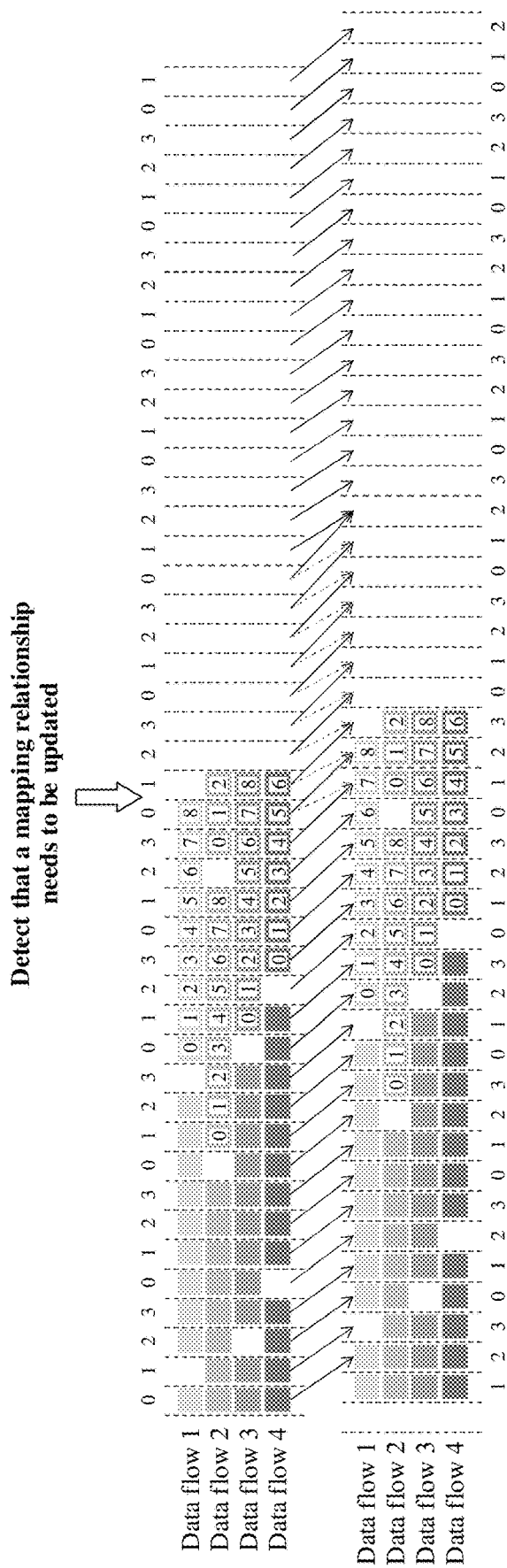
FIG. 9 is a schematic diagram of packet sending in a cycle.

(1) After it is detected that the cycle mapping relationship needs to be updated, a first cycle is shown in FIG. 9.

In this cycle, no packet in the data flow 1 is sent, all numbers of packets in the data flow 2 are 2, all numbers of packets in the data flow 3 are 8, and all numbers of packets in the data flow 4 are 6. In this cycle, no packet whose number is 0 is received. Therefore, all packets are sent according to the old cycle mapping relationship.

Figure 10:
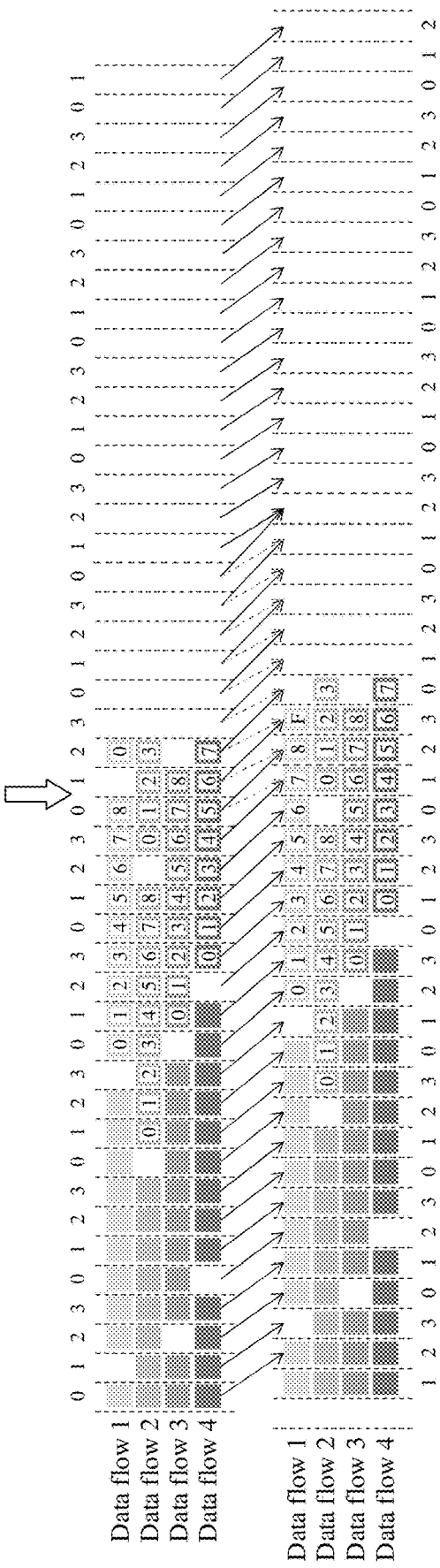
FIG. 10 is a schematic diagram of packet sending in a cycle.

(2) A second cycle (namely, the $M^{th}$ cycle, and also the cycle corresponding to the packet carrying the number 0 that appears for the first time) is shown in FIG. 10.

In this cycle, the packet whose number is 0 appears for the first time. All packets whose numbers are 0 are forwarded according to the new cycle mapping relationship, and packets carrying other numbers are forwarded according to the old cycle mapping relationship.

In this cycle, all numbers of packets in the data flow 1 are 0, all numbers of packets in the data flow 2 are 3, no packet in the data flow 3 is sent, and all numbers of packets in the data flow 4 are 7. In this cycle, all packets whose numbers are 0 (that is, the packets in the data flow 1) are sent according to the new cycle mapping relationship, and the numbers carried in the packets are modified to F. Packets in other flows, that is, the data flows 2 and 4, are sent according to the old cycle mapping relationship.

Figure 11:
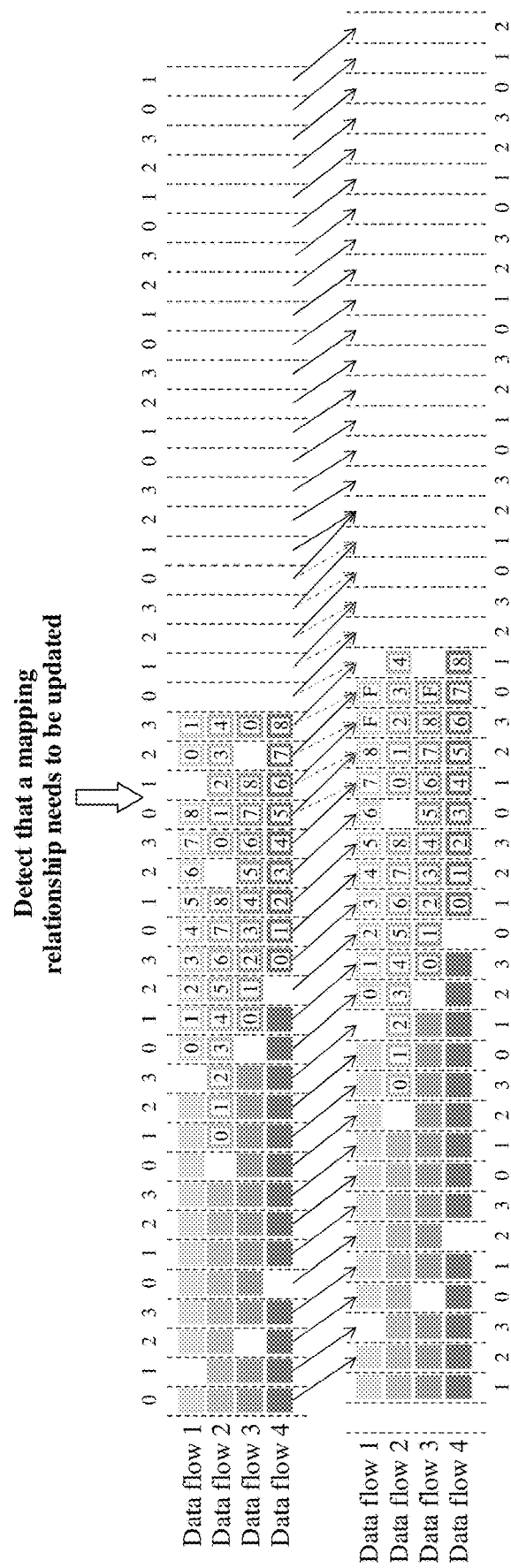
FIG. 11 is a schematic diagram of packet sending in a cycle.

(3) A third cycle is shown in FIG. 11.

In this cycle, all packets whose numbers are 0 or 1 are forwarded according to the new cycle mapping relationship, and packets carrying other numbers are forwarded according to the old cycle mapping relationship.

In this cycle, all numbers of packets in the data flow 1 are 1, all numbers of packets in the data flow 2 are 4, all numbers of packets in the data flow 3 are 0, and all numbers of packets in the data flow 4 are 8. In this cycle, all packets whose numbers are 0 or 1 (that is, the packets in the data flows 1 and 3) are sent according to the new cycle mapping relationship, and the numbers carried in the packets are modified to F. Packets in other flows (that is, the data flows 2 and 4) are sent according to the old cycle mapping relationship.

Figure 12:
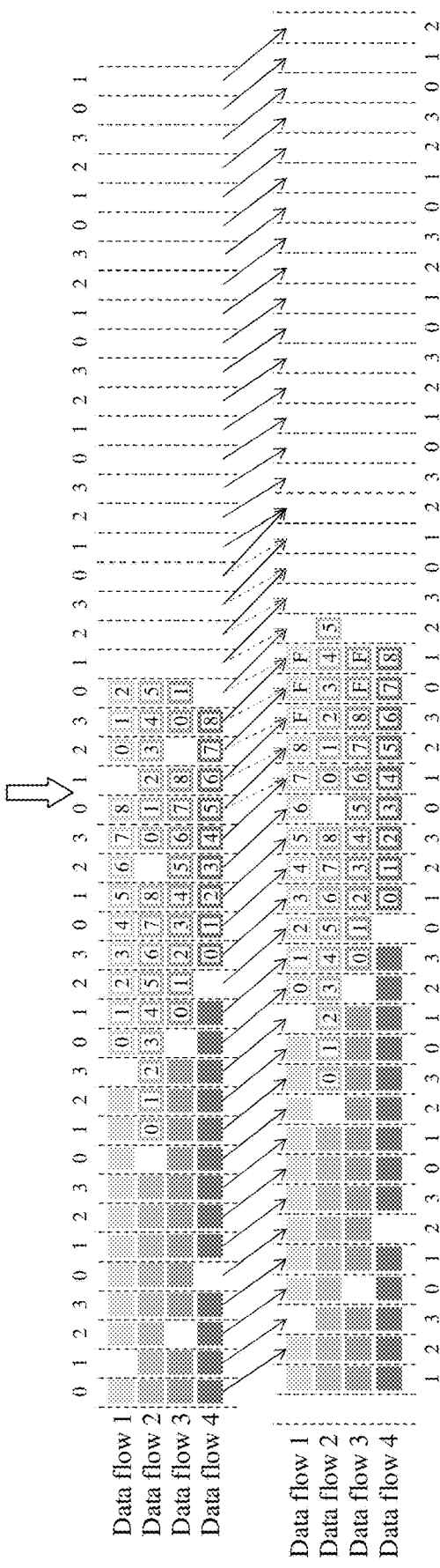
FIG. 12 is a schematic diagram of packet sending in a cycle.

(4) A fourth cycle is shown in FIG. 12.

In this cycle, all packets whose numbers are 0, 1, or 2 are forwarded according to the new cycle mapping relationship, and packets carrying other numbers are forwarded according to the old cycle mapping relationship.

In this cycle, all numbers of packets in the data flow 1 are 2, all numbers of packets in the data flow 2 are 5, all numbers of packets in the data flow 3 are 1, and no packets in the data flow 4 is sent. In this cycle, all packets whose numbers are 0, 1, or 2 (that is, the packets in the data flows 1 and 3) are sent according to the new cycle mapping relationship, and the numbers carried in the packets are modified to F. Packets in another flow (that is, the data flow 2) are sent according to the old cycle mapping relationship.

Figure 13:
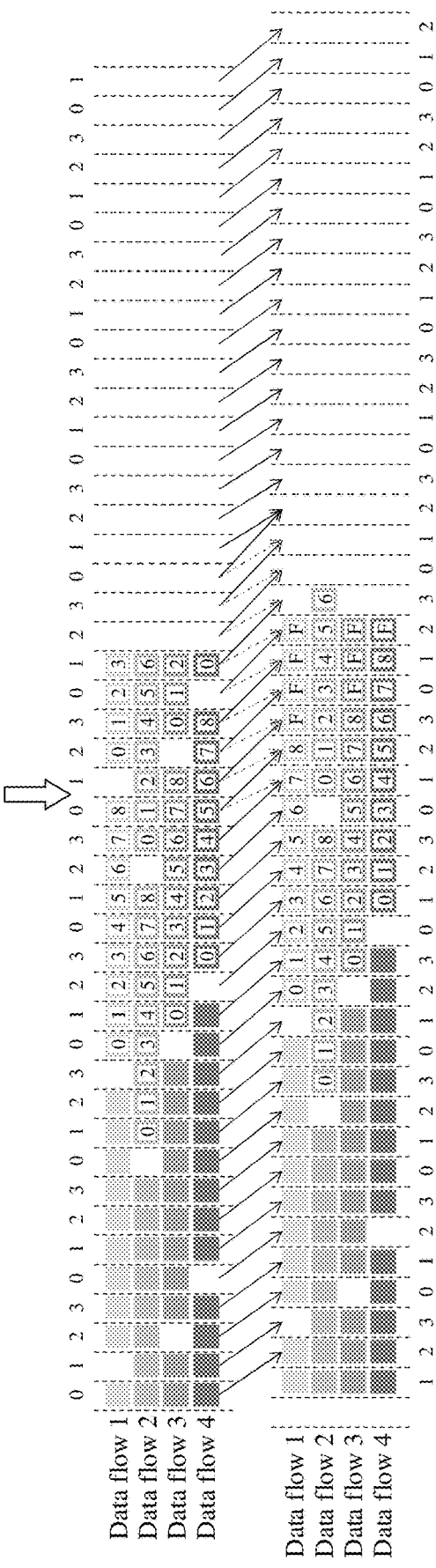
FIG. 13 is a schematic diagram of packet sending in a cycle.

(5) A fifth cycle is shown in FIG. 13.

In this cycle, all packets whose numbers are 0, 1, 2, or 3 are forwarded according to the new cycle mapping relationship, and packets carrying other number are forwarded according to the old cycle mapping relationship.

In this cycle, all numbers of packets in the data flow 1 are 3, all numbers of packets in the data flow 2 are 6, all numbers of packets in the data flow 3 are 2, and all numbers of packets in the data flow 4 are 0. In this cycle, all packets whose numbers are 0, 1, 2, or 3 (that is, the packets in the data flows 1, 3, and 4) are sent according to the new cycle mapping relationship, and the numbers carried in the packets are modified to F. Packets in another flow (that is, the data flow 2) are sent according to the old cycle mapping relationship.

Figure 14:
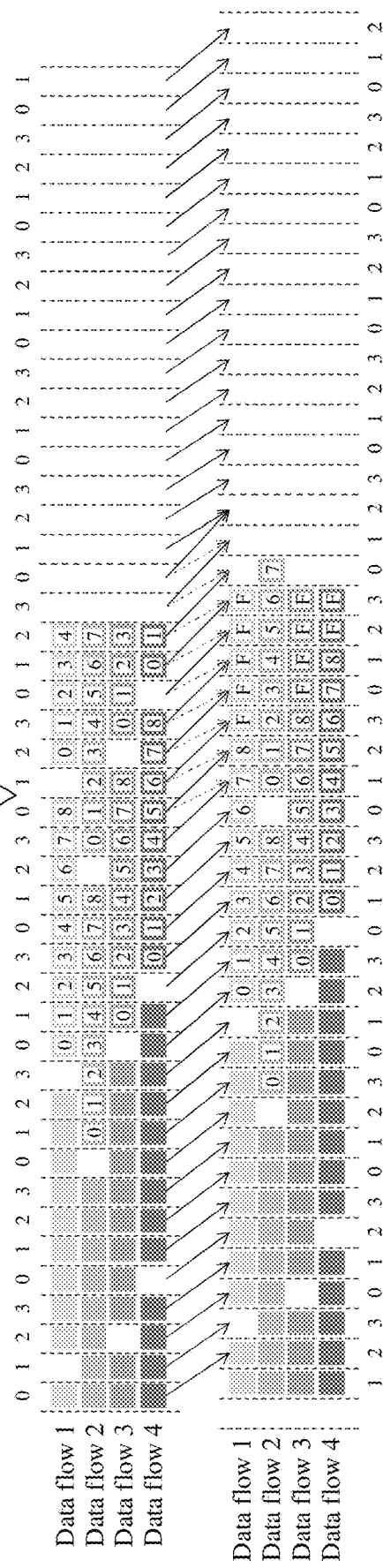
FIG. 14 is a schematic diagram of packet sending in a cycle.

(6) A sixth cycle is shown in FIG. 14.

In this cycle, all packets whose numbers are 0, 1, 2, 3, or 4 are forwarded according to the new cycle mapping relationship, and packets carrying other numbers are forwarded according to the old cycle mapping relationship.

In this cycle, all numbers of packets in the data flow 1 are 4, all numbers of packets in the data flow 2 are 7, all numbers of packets in the data flow 3 are 3, and all numbers of packets in the data flow 4 are 1. In this cycle, all packets whose numbers are 0, 1, 2, 3, or 4 (that is, the packets in the data flows 1, 3, and 4) are sent according to the new cycle mapping relationship, and the numbers carried in the packets are modified to F. Packets in another flow (that is, the data flow 2) are sent according to the old cycle mapping relationship.

Figure 15:
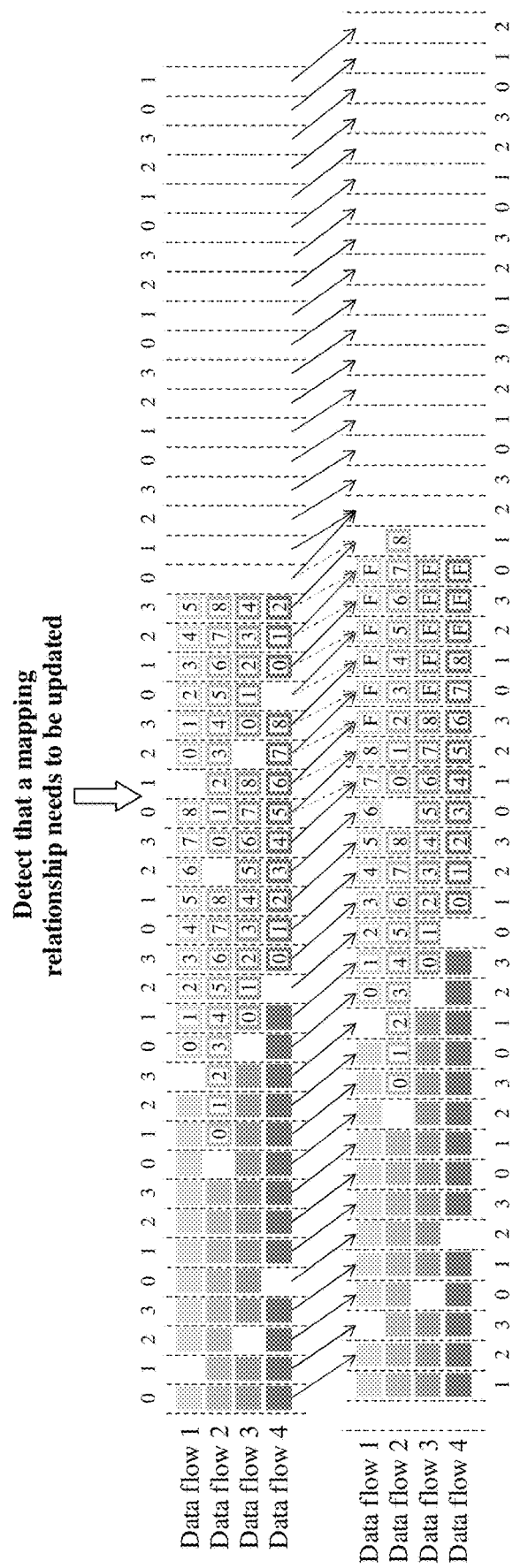
FIG. 15 is a schematic diagram of packet sending in a cycle.

(7) A seventh cycle is shown in FIG. 15.

In this cycle, all packets whose numbers are 0, 1, 2, 3, 4, or 5 are forwarded according to the new cycle mapping relationship, and packets carrying other numbers are forwarded according to the old cycle mapping relationship.

In this cycle, all numbers of packets in the data flow 1 are 5, all numbers of packets in the data flow 2 are 8, all numbers of packets in the data flow 3 are 4, and all numbers of packets in the data flow 4 are 2. In this cycle, all packets whose numbers are 0, 1, 2, 3, 4, or 5 (that is, the packets in the data flows 1, 3, and 4) are sent according to the new cycle mapping relationship, and the numbers carried in the packets are modified to F. Packets in another flow (that is, the data flow 2) are sent according to the old cycle mapping relationship.

Figure 16:
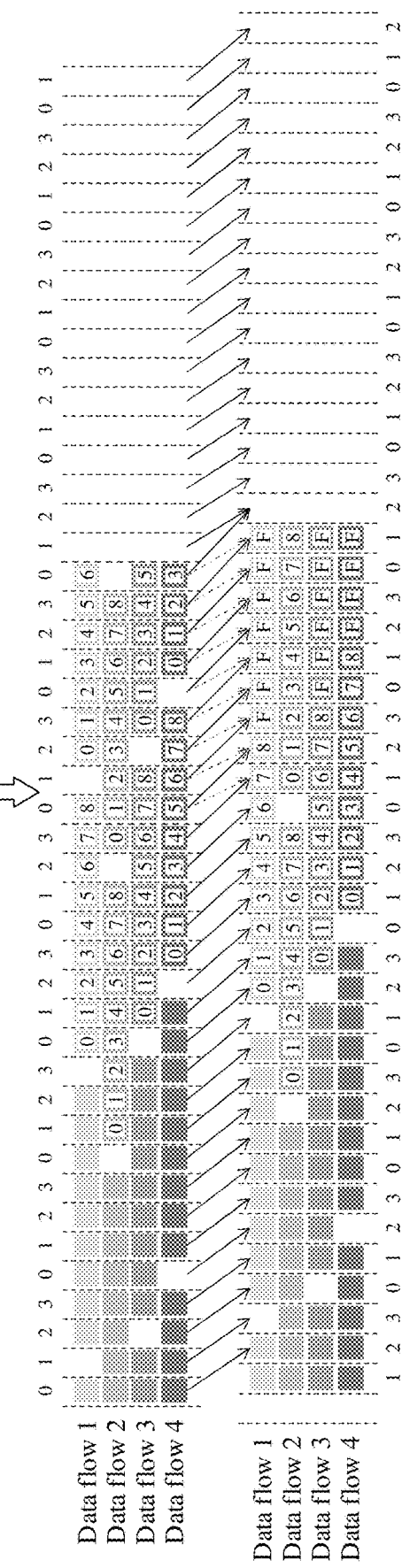
FIG. 16 is a schematic diagram of packet sending in a cycle.

(8) An eighth cycle is shown in FIG. 16.

In this cycle, all packets whose numbers are 0, 1, 2, 3, 4, 5, or 6 are forwarded according to the new cycle mapping relationship, and packets carrying other numbers are forwarded according to the old cycle mapping relationship.

In this cycle, all numbers of packets in the data flow 1 are 6, no packet in the data flow 2 is sent, all numbers of packets in the data flow 3 are 5, and all numbers of packets in the data flow 4 are 3. In this cycle, all packets whose numbers are 0, 1, 2, 3, 4, 5, or 6 (that is, the packets in the data flows 1, 3, and 4) are sent according to the new cycle mapping relationship, and the numbers carried in the packets are modified to F.

Figure 17:
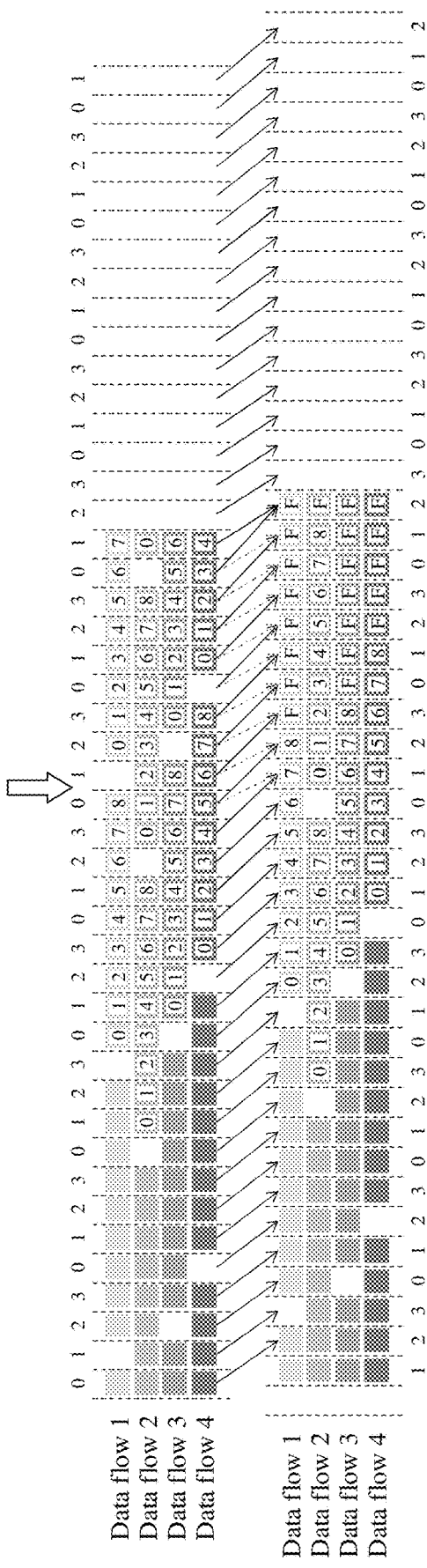
FIG. 17 is a schematic diagram of packet sending in a cycle.

(9) A ninth (namely, the $(M+X)^{th}$, where X is 7) cycle is shown in FIG. 17.

All packets exchange cycles labels according to a new mapping relationship, and the old cycle mapping relationship is deleted. All subsequent packets exchange cycle labels according to the new mapping relationship, and numbers carried in all packets whose numbers are 0 to X, that is, packets whose numbers are 0, 1, 2, 3, 4, 5, 6, or 7 (that is, packets of the data flows 1, 2, 3, and 4) are modified to F.

Figure 18:
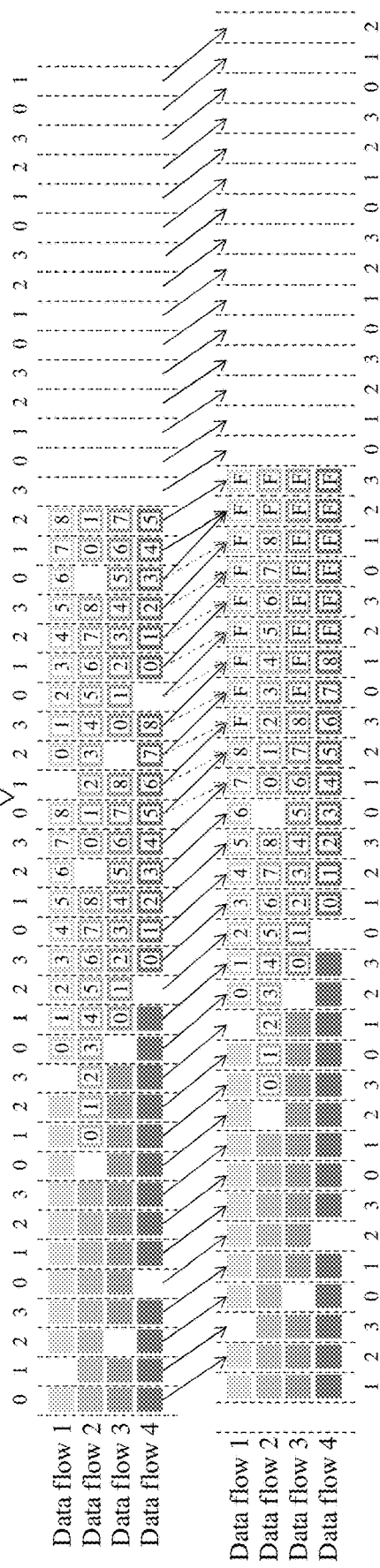
FIG. 18 is a schematic diagram of packet sending in a cycle.

(10) A tenth cycle is shown in FIG. 18.

All packets exchange cycle labels according to the new mapping relationship, and numbers carried in all packets whose numbers are 1 to X+1 (N−X−1 to N−1), that is, 1, 2, 3, 4, 5, 6, 7, or 8 (that is, packets of the data flows 1, 2, 3, and 4) are modified to F.

Figure 19:
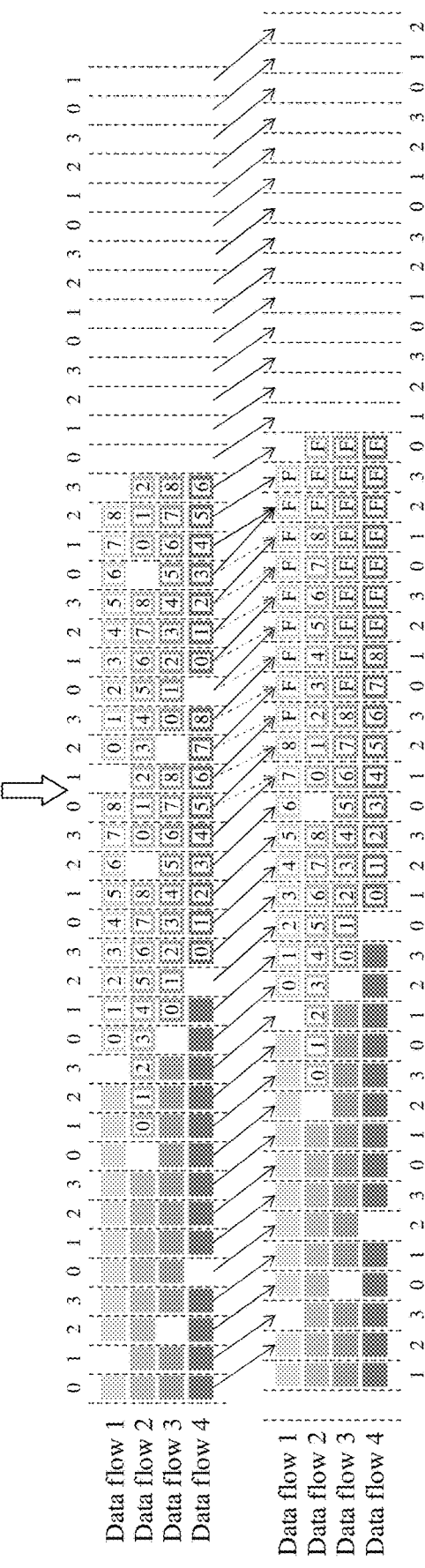
FIG. 19 is a schematic diagram of packet sending in a cycle.

(11) An eleventh cycle is shown in FIG. 19.

All packets exchange cycle labels according to the new mapping relationship, and numbers carried in all packets whose numbers are N−X to N−1, that is, 2, 3, 4, 5, 6, 7, or 8 (that is, packets of the data flows 2, 3, and 4) are modified to F.

Figure 20:
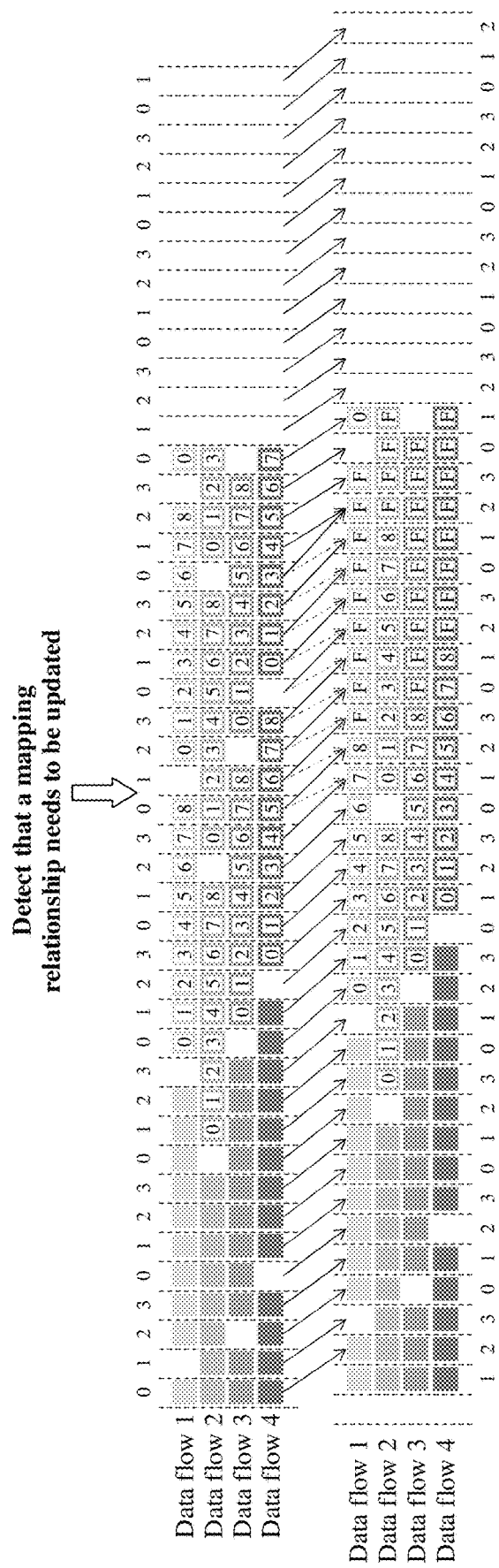
FIG. 20 is a schematic diagram of packet sending in a cycle.

(12) A twelfth cycle is shown in FIG. 20.

All packets exchange cycle labels according to the new mapping relationship, and numbers carried in all packets whose numbers are N−X+1 to N−1, that is, 3, 4, 5, 6, 7, or 8 (that is, packets of the data flows 2 and 4) are modified to F.

(13) Operations in several subsequent cycles (namely, a thirteenth cycle to a fifteenth cycle) are similar to those described above, and details are not described again.

Figure 21:
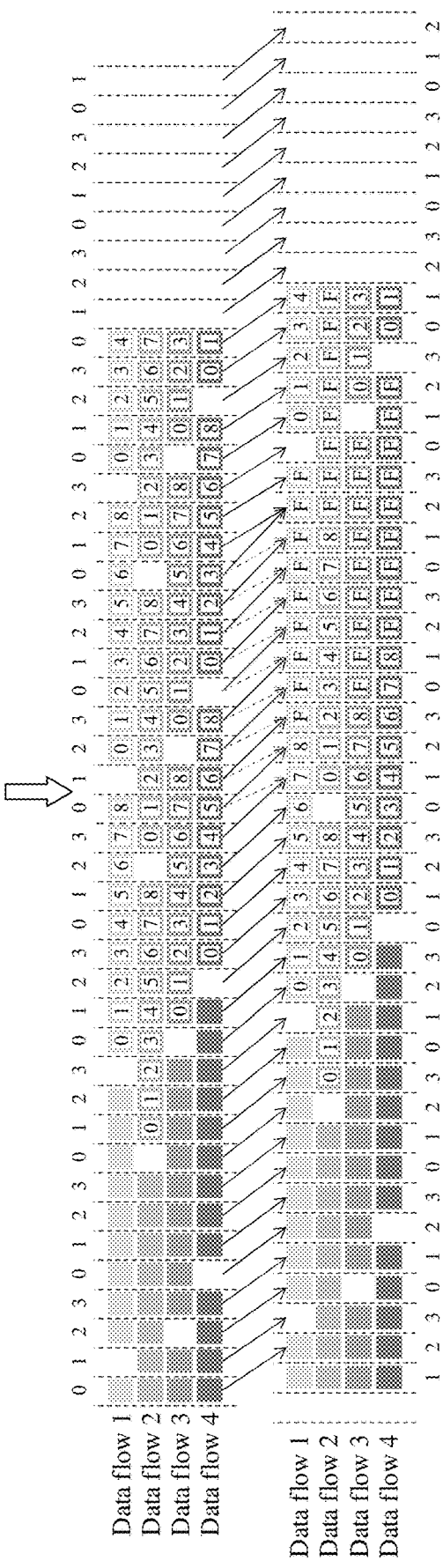
FIG. 21 is a schematic diagram of packet sending in a cycle.

(14) A sixteenth cycle is shown in FIG. 21.

All packets exchange cycle labels according to the new mapping relationship, and numbers carried in all packets whose numbers are N−X+5 to N−1, that is, 7 or 8 (that is, packets of the data flow 2) are modified to F.

Figure 22:
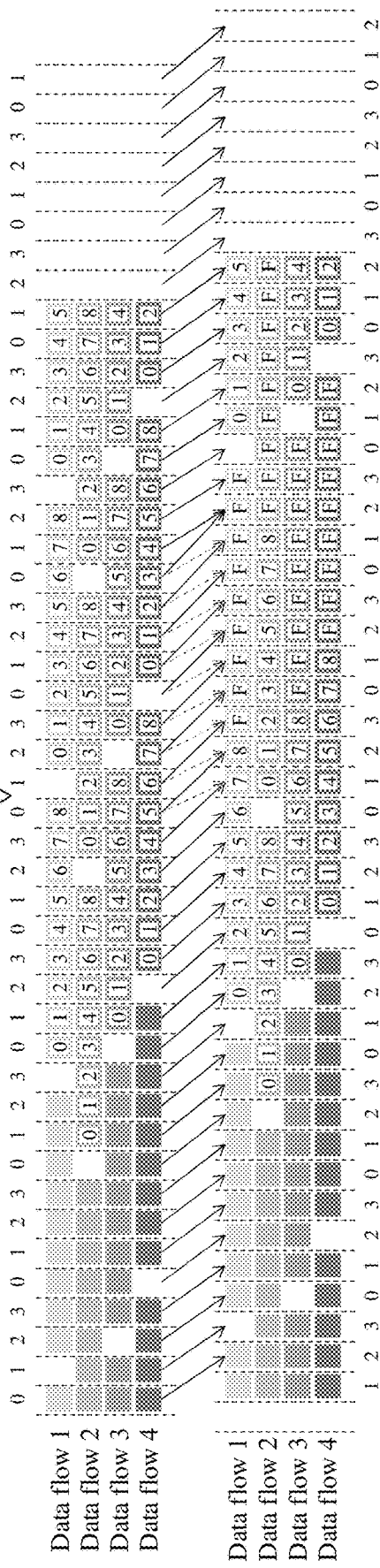
FIG. 22 is a schematic diagram of packet sending in a cycle.

(15) A seventeenth $(M+N+X-1)^{th}$ cycle is shown in FIG. 22.

All packets exchange cycle labels according to the new mapping relationship, and numbers carried in all packets whose numbers are N−X+6 to N−1, that is, 8 (that is, packets of the data flow 2) are modified to F. After that, an entire mapping relationship updating process ends.

Figure 23:
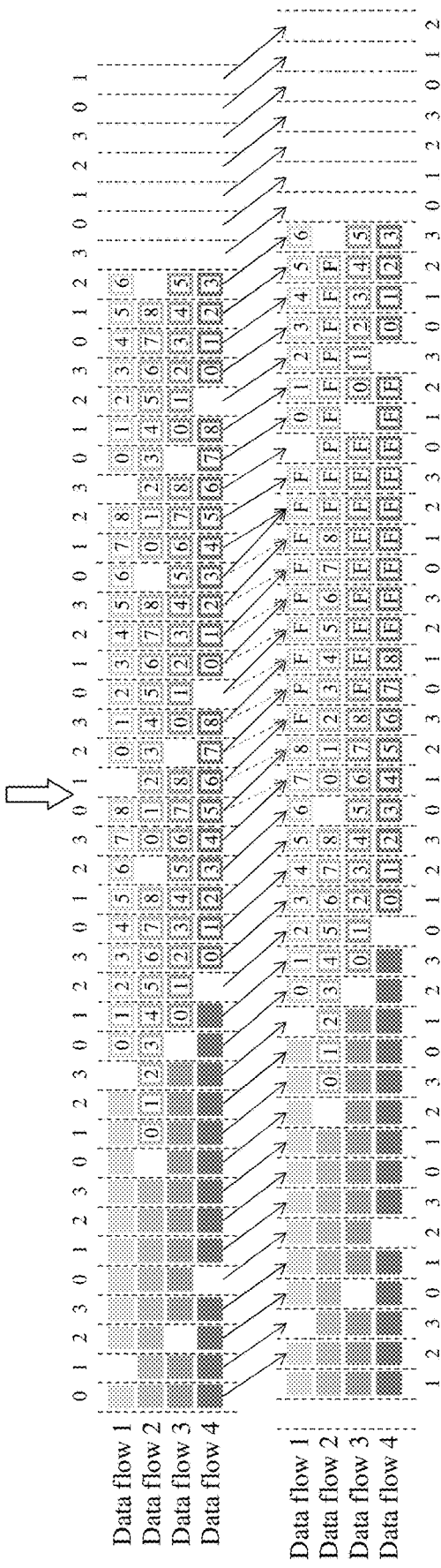
FIG. 23 is a schematic diagram of packet sending in a cycle.

(16) An eighteenth cycle is shown in FIG. 23.

Packets exchange cycle labels according to the new mapping relationship.

Figure 24:
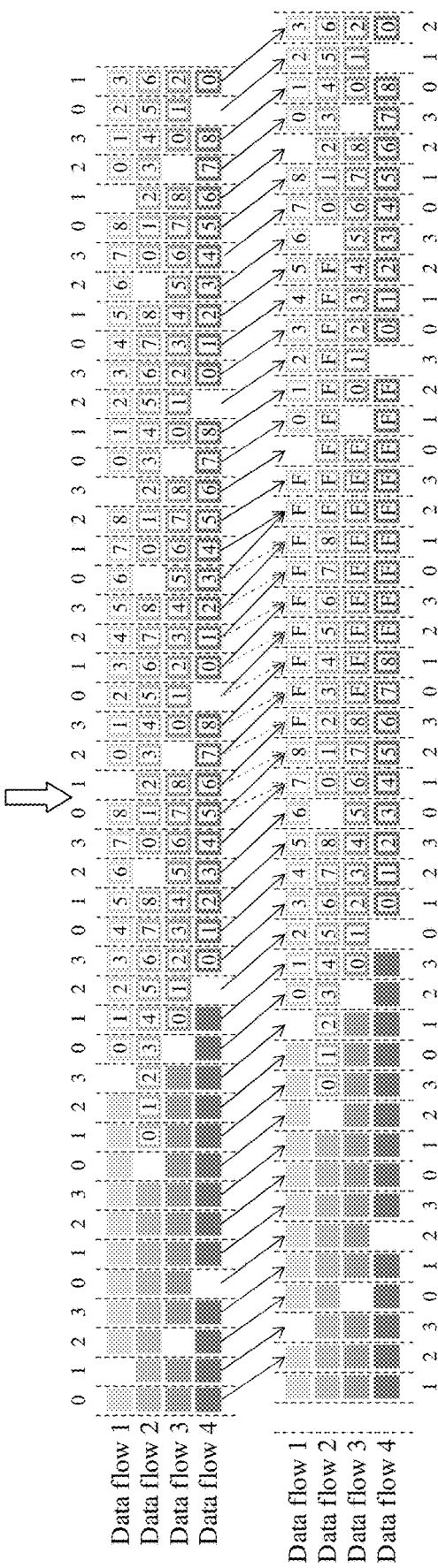
FIG. 24 is a schematic diagram of packet sending in a cycle.

(17) A subsequent nineteenth cycle and subsequent cycles are shown in FIG. 24.

Packets exchange cycle labels according to the new mapping relationship.

The foregoing describes the solutions provided from a perspective of interaction between network elements. It may be understood that to implement the foregoing functions, each network element includes a corresponding hardware structure and/or software module for implementing each function. A person of ordinary skill in the art should be easily aware that, in combination with the examples described in the embodiments, units and algorithm steps may be implemented by hardware or a combination of hardware and computer software in the present invention. Whether a function is performed by hardware or hardware driven by computer software depends on particular applications and design constraints of the solutions. A person of ordinary skill in the art may use different methods to implement the described functions for each particular application, but it should not be considered that the implementation goes beyond the scope of the embodiments.

Figure 25:
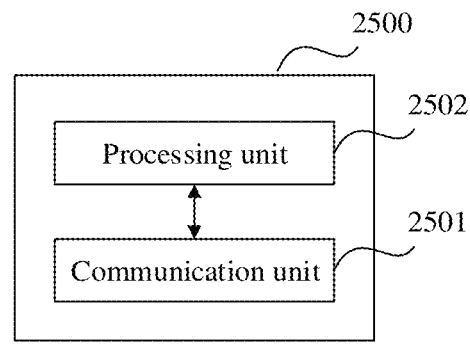
FIG. 25 is a schematic diagram of a packet transmission apparatus.

FIG. 25 is a possible example block diagram of a packet transmission apparatus according. The apparatus 2500 may exist in a form of software or hardware. The apparatus 2500 includes a processing unit 2502 and a communication unit 2501. In an implementation, the communication unit 2501 may include a receiving unit and a sending unit. The processing unit 2502 is configured to control and manage an action of the apparatus 2500. The communication unit 2501 is configured to support communication between the apparatus 2500 and another network entity.

The processing unit 2502 may be a processor or a controller, for example, a general-purpose central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processing module may implement or execute various example logical blocks, modules, and circuits described with reference to content described in the embodiments. The processor may be a combination of processors implementing a computing function, for example, a combination including one or more microprocessors, or a combination of a DSP and a microprocessor. The communication unit 2501 is an interface circuit of the apparatus and is configured to receive a signal from another apparatus. For example, when the apparatus is implemented in a form of a chip, the communication unit 2501 is an interface circuit of the chip for receiving a signal from another chip or apparatus, or an interface circuit of the chip for sending a signal to another chip or apparatus.

The apparatus 2500 may be the second device, the gateway device, or the first device in any one of the foregoing embodiments or may be a chip used in the second device, the gateway device, or the first device. For example, when the apparatus 2500 is the second device, the processing unit 2502 may be a processor, and the communication unit 2501 may be a transceiver. Optionally, the transceiver may include a radio frequency circuit. For example, when the apparatus 2500 is the chip used in the second device, the processing unit 2502 may be, for example, a processor, and the communication unit 2501 may be, for example, an input/output interface, a pin, or a circuit. The processing unit 2502 may execute computer-executable instructions stored in a storage unit. Optionally, the storage unit is a storage unit inside the chip, such as a register or a buffer. Alternatively, the storage unit may be a storage unit that is inside the second device and that is located outside the chip, such as a read-only memory (ROM), another type of static storage device that can store static information and instructions, or a random access memory (, RAM).

In an embodiment, the apparatus 2500 is the second device. The communication unit 2501 is configured to receive at least one first packet from a first device. The first packet includes a first cycle label and a first number, and the first packet is a packet sent by the first device in a cycle corresponding to the first cycle label. The processing unit 2502 is configured to: when the first number of the first packet meets a first condition, determine a second cycle label corresponding to the first cycle label. The communication unit 2501 is further configured to send the first packet to a third device in a cycle corresponding to the second cycle label. The processing unit 2502 is further configured to: when the first number of the first packet meets a second condition, determine a third cycle label corresponding to the first cycle label. The communication unit 2501 is further configured to send the first packet to the third device in a cycle corresponding to the third cycle label. The cycle corresponding to the second cycle label and the cycle corresponding to the third cycle label are different cycles.

In a possible implementation, the processing unit 2502 is further configured to: before the communication unit 2501 sends the first packet to the third device in the cycle corresponding to the second cycle label, update the first cycle label included in the first packet to the second cycle label; and before the communication unit 2501 sends the first packet to the third device in the cycle corresponding to the third cycle label, update the first cycle label included in the first packet to the third cycle label.

In a possible implementation, the processing unit 2502 is further configured to: if determining that the first number belongs to a first set, determine that the first number of the first packet meets the first condition; and if determining that the first number does not belong to the first set, determine that the first number of the first packet meets the second condition. The first set is used to indicate a cycle mapping manner.

In a possible implementation, the first number is one of N numbers starting from a start number, the N numbers correspond to N cycles, and N is a positive integer. If the communication unit 2501 does not receive a packet carrying the start number after an update condition of a cycle mapping relationship is met and before the first packet is received, the first set is an empty set. Alternatively, the first set includes L consecutive numbers starting from the start number in the N numbers. When a quantity of cycles between a cycle in which the first packet is located and a target cycle is less than N, L is equal to the quantity of cycles between the cycle in which the first packet is located and the target cycle plus 1; or when a quantity of cycles between a cycle in which the first packet is located and a target cycle is greater than or equal to N, L is equal to N, the target cycle is a cycle in which a packet carrying the start number appears for a first time on the first device after an update condition of a cycle mapping relationship is met. The cycle in which the first packet is located is not earlier than the target cycle.

In a possible implementation, the first number is one of N numbers starting from a start number, the N numbers correspond to N cycles, and N is a positive integer. The first set includes P consecutive numbers starting from the start number in the N numbers, and P is equal to a quantity of cycles between a cycle in which the first packet is located and a first cycle after a cycle update condition is met plus 1.

In a possible implementation, the first packet sent to the third device in the cycle corresponding to the second cycle label further includes the first number or a preset number; and the first packet sent to the third device in the cycle corresponding to the third cycle label further includes the first number.

In a possible implementation, the processing unit 2502 is further configured to: before the communication unit 2501 receives the at least one first packet from the first device, determine that the update condition of the cycle mapping relationship is met.

In a possible implementation, the processing unit 2502 is configured to: if a first cycle of the apparatus after a latest moment at which a packet in a current cycle of an egress interface of the first device arrives at an egress interface of the apparatus, is earlier than a cycle of the apparatus corresponding to the current cycle in an old cycle mapping relationship, determine that the update condition of the cycle mapping relationship is met. The latest moment at which the packet in the current cycle of the egress interface of the first device arrives at the egress interface of the apparatus is denoted as $t1$. $t1=t0+T+D$. $t0$ is a moment at which a first bit of a first packet in the current cycle arrives at an ingress interface of the apparatus, T is a length of a cycle in which the first device sends a packet, and D is a maximum value of an internal processing delay of the apparatus.

In still another embodiment, the apparatus 2500 is the first device, and the communication unit 2501 includes a sending unit and a receiving unit. The receiving unit is configured to obtain at least one packet of a first data flow. A sum of sizes of the at least one packet does not exceed a maximum sending quantity of the first data flows in one cycle of the apparatus. The sending unit is configured to send at least one packet to a second device in a cycle corresponding to a first cycle label. Each packet in the at least one packet sent to the second device carries the first cycle label and a first number.

In a possible implementation, if a current cycle of the first device is a sending cycle corresponding to the first data flow, the cycle corresponding to the first cycle label is the current cycle; and if the current cycle of the first device is an idle cycle corresponding to the first data flow, the cycle corresponding to the first cycle label is a first sending cycle after the current cycle.

In a possible implementation, in cycles corresponding to the first device, there are K idle cycles after every N consecutive sending cycles, the first number is one of N numbers starting from a start number, the N numbers correspond to N consecutive sending cycles, N is a positive integer, and K is a positive integer not greater than N.

In still another embodiment, the apparatus 2500 is the gateway device, and the communication unit 2501 includes a sending unit and a receiving unit. The receiving unit is configured to obtain at least one packet of a first data flow. A sum of sizes of the at least one packet does not exceed a maximum sending quantity of the first data flows in a cycle of the gateway device. The sending unit is configured to: if a current cycle of the apparatus is a sending cycle corresponding to the first data flow, send a first packet in the sending cycle; and if the current cycle of the apparatus is an idle cycle corresponding to the first data flow, send the first packet in a first sending cycle after the idle cycle. In cycles corresponding to the apparatus, there are K idle cycles after every N consecutive sending cycles, N is a positive integer, and K is a positive integer not greater than N.

In a possible implementation, the first packet sent in the sending cycle further includes a first number and a cycle label corresponding to the sending cycle, the first number is one of N numbers starting from a start number, the N numbers correspond to N sending cycles, and N is a positive integer.

It may be understood that, for a specific implementation process and corresponding beneficial effects when the apparatus is used in the packet transmission method, refer to related description in the foregoing method embodiments. Details are not described herein again.

Figure 26:
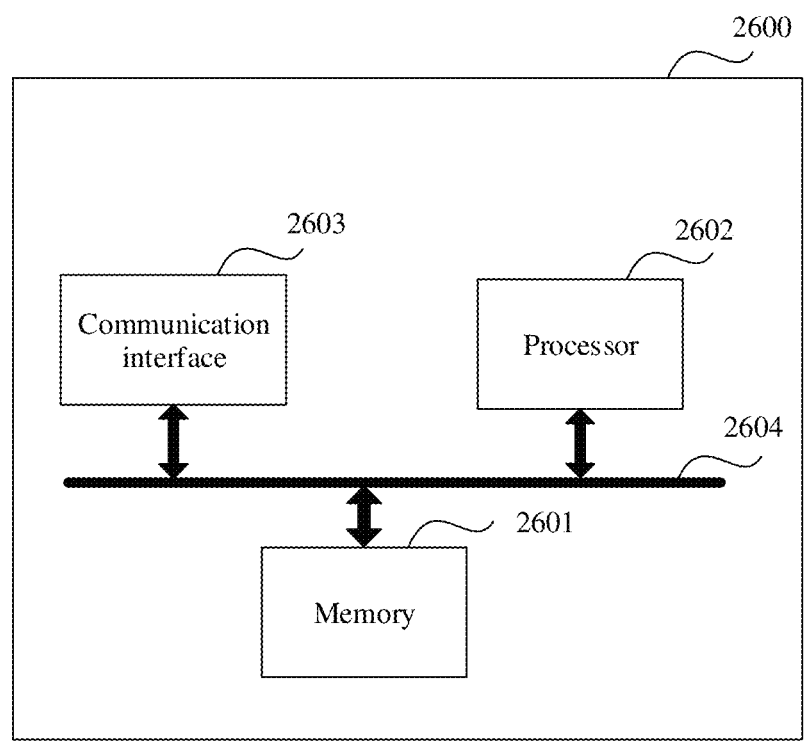
FIG. 26 is a schematic diagram of another packet transmission apparatus.

FIG. 26 is a schematic diagram of a packet transmission apparatus. The apparatus may be the second device, the gateway device, or the first device in the foregoing embodiments. The apparatus 2600 includes a processor 2602, a communication interface 2603, and a memory 2601. Optionally, the apparatus 2600 may further include a communication line 2604. The communication interface 2603, the processor 2602, and the memory 2601 may be connected to each other through the communication line 2604. The communication line 2604 may be a peripheral component interconnect (PCI) bus, an extended industry standard architecture (EISA) bus, or the like. The communication line 2604 may be classified into an address bus, a data bus, a control bus, and the like. For ease of representation, only one thick line is used to represent the bus in FIG. 26, but this does not mean that there is only one bus or only one type of bus.

The processor 2602 may be a CPU, a microprocessor, an ASIC, or one or more integrated circuits configured to control program execution in the solutions of the embodiments.

The communication interface 2603 is any apparatus such as a transceiver and is configured to communicate with another device or communication network, for example, an Ethernet, a radio access network (RAN), a wireless local area network (WLAN), or a wired access network.

The memory 2601 may be a ROM, another type of static storage device that can store static information and instructions, a RAM, or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of instructions or a data structure and that can be accessed by a computer, but is not limited thereto. The memory may exist independently and is connected to the processor through the communication line 2604. The memory may alternatively be integrated with the processor.

The memory 2601 is configured to store computer-executable instructions for executing the solutions in the embodiments, and the processor 2602 controls the execution. The processor 2602 is configured to execute the computer-executable instructions stored in the memory 2601, to implement the packet transmission method provided in the foregoing embodiment.

Optionally, the computer-executable instructions in this embodiment may also be referred to as application program code. This is not limited in this embodiment.

A person of ordinary skill in the art may understand that first, second, and various reference numerals are merely distinguished for convenient description and are not used to limit a scope of the embodiments, and also indicate a sequence. The term "and/or" describes an association relationship for describing associated objects and represents that three relationships may exist. For example, A and/or B may represent the following three cases: only A exists, both A and B exist, and only B exists. The character "/" usually indicates an "or" relationship between associated objects. The term "at least one" means one or more. At least two means two or more. "At least one", "any one", or a similar expression thereof means any combination of the items, including a singular item (piece) or any combination of plural items (pieces). For example, at least one (piece, or type) of a, b, or c may indicate: a, b, c, a and b, a and c, b and c, or a, b, and c, where a, b, and c may be singular or plural. The term "a plurality of" means two or more, and another quantifier is similar to this. In addition, an element (element) that appears in singular forms "a", "an", and "the" does not mean "one or only one" unless otherwise specified in the context, but means "one or more". For example, "a device" means one or more such devices.

All or some of the foregoing embodiments may be implemented through software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to the embodiments are all or partially generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

The various illustrative logical units and circuits described in the embodiments may implement or operate the described functions by using a general-purpose processor, a digital signal processor, an ASIC, an FPGA or another programmable logic apparatus, a discrete gate or transistor logic, a discrete hardware component, or a design of any combination thereof. The general-purse processor may be a microprocessor. Optionally, the general-purpose processor may be any conventional processor, controller, microcontroller, or state machine. The processor may alternatively be implemented by a combination of computing apparatuses, such as a digital signal processor and a microprocessor, a plurality of microprocessors, one or more microprocessors with one digital signal processor core, or any other similar configuration.

The steps of the method or algorithm described in the embodiments may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium in any other form in the art. For example, the storage medium may be connected to the processor, so that the processor can read information from the storage medium and write information to the storage medium. Optionally, the storage medium may be integrated into a processor. The processor and the storage medium may be disposed in an ASIC.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Although the embodiments are described with reference to specific features, it is clear that various modifications and combinations may be made to them without departing from the scope of the embodiments. Correspondingly, the embodiments and the accompanying drawings are merely example descriptions. It is clear that a person of ordinary skill in the art can make various modifications and variations without departing from the scope of the embodiments.

What is claimed is:

1. A packet transmission method, comprising:
   receiving, by a second device, at least one first packet from a first device, wherein the first packet comprises a first cycle label and a first number, and the first packet is a packet sent by the first device in a cycle corresponding to the first cycle label;
   when the first number of the first packet meets a first condition, determining, by the second device, a second cycle label corresponding to the first cycle label, and sending the first packet to a third device in a cycle corresponding to the second cycle label; and
   when the first number of the first packet meets a second condition, determining, by the second device, a third cycle label corresponding to the first cycle label, and sending the first packet to the third device in a cycle corresponding to the third cycle label, wherein the cycle corresponding to the second cycle label and the cycle corresponding to the third cycle label are different cycles.

2. The packet transmission method according to claim 1, wherein before the sending, by the second network device, of the first packet to a third device in a cycle corresponding to the second cycle label, the method further comprises:
   updating, by the second device, the first cycle label comprised in the first packet to the second cycle label; and
   before the sending, by the second network device, of the first packet to the third device in a cycle corresponding to the third cycle label, the method further comprises:
   updating, by the second device, the first cycle label comprised in the first packet to the third cycle label.

3. The packet transmission method according to claim 1, further comprising:
   when determining that the first number belongs to a first set, determining, by the second device, that the first number of the first packet meets the first condition; and
   when determining that the first number does not belong to the first set, determining, by the second device, that the first number of the first packet meets the second condition.

4. The packet transmission method according to claim 3, wherein the first number is one of N numbers starting from a start number, the N numbers correspond to N cycles, and N is a positive integer; and
   when the second device does not receive a packet carrying the start number after an update condition of a cycle mapping relationship is met and before the first packet is received, the first set is an empty set; or
   the first set comprises L consecutive numbers starting from the start number in the N numbers, wherein when a quantity of cycles between a cycle in which the first packet is located and a target cycle is less than N, L is equal to the quantity of cycles between the cycle in which the first packet is located and the target cycle plus 1; or when a quantity of cycles between a cycle in which the first packet is located and a target cycle is greater than or equal to N, L is equal to N, the target cycle is a cycle in which a packet carrying the start number appears for a first time on the first device after an update condition of a cycle mapping relationship is met, and the cycle in which the first packet is located is not earlier than the target cycle.

5. The packet transmission method according to claim 3, wherein the first number is one of N numbers starting from a start number, the N numbers correspond to N cycles, and N is a positive integer; and the first set comprises P consecutive numbers starting from the start number in the N numbers, and P is equal to a quantity of cycles between a cycle in which the first packet is located and a first cycle after a cycle update condition is met plus 1.

6. The packet transmission method according to claim 3, wherein the first packet sent to the third device in the cycle corresponding to the second cycle label further comprises the first number or a preset number; and the first packet sent to the third device in the cycle corresponding to the third cycle label further comprises the first number.

7. The packet transmission method according to claim 1, wherein before the receiving, by a second device, of at least one first packet from a first device, the method further comprises:

determining, by the second device, that the update condition of the cycle mapping relationship is met.

8. The packet transmission method according to claim 7, wherein the determining, by the second device, that the update condition of the cycle mapping relationship is met comprises:

when a first cycle of the second device after a latest moment at which a packet in a current cycle of an egress interface of the first device arrives at an egress interface of the second device is earlier than a cycle of the second device that corresponds to the current cycle in an old cycle mapping relationship, determining, by the second device, that the update condition of the cycle mapping relationship is met.

9. A packet transmission apparatus, comprising:
one or more processors; and
a non-transitory computer-readable memory storing a program to be executed by the one or more processors, the program including instructions that, when executed by the one or more processors, cause the apparatus to:
receive at least one first packet from a first device, wherein the first packet comprises a first cycle label and a first number, and the first packet is a packet sent by the first device in a cycle corresponding to the first cycle label;
determine, when the first number of the first packet meets a first condition, a second cycle label corresponding to the first cycle label, and the communication unit is further configured to send the first packet to a third device in a cycle corresponding to the second cycle label; and
determine, when the first number of the first packet meets a second condition, a third cycle label corresponding to the first cycle label, and the communication unit is further configured to send the first packet to the third device in a cycle corresponding to the third cycle label, wherein the cycle corresponding to the second cycle label and the cycle corresponding to the third cycle label are different cycles.

10. The packet transmission apparatus according to claim 9, wherein the program further comprises instructions that cause the apparatus to:

before sending the first packet to the third device in the cycle corresponding to the second cycle label, update the first cycle label comprised in the first packet to the second cycle label; and before sending the first packet to the third device in the cycle corresponding to the third cycle label, update the first cycle label comprised in the first packet to the third cycle label.

11. The packet transmission apparatus according to claim 9, wherein the program further comprises instructions that cause the apparatus to:

when determining that the first number belongs to a first set, determine that the first number of the first packet meets the first condition; and when determining that the first number does not belong to a first set, determine that the first number of the first packet meets the second condition.

12. The packet transmission apparatus according to claim 11, wherein the first number is one of N numbers starting from a start number, the N numbers correspond to N cycles, and N is a positive integer; and the first set comprises P consecutive numbers starting from the start number in the N numbers, and P is equal to a quantity of cycles between a cycle in which the first packet is located and a first cycle after a cycle update condition is met plus 1.

13. The packet transmission apparatus according to claim 11, wherein the first packet sent to the third device in the cycle corresponding to the second cycle label further comprises the first number or a preset number; and the first packet sent to the third device in the cycle corresponding to the third cycle label further comprises the first number.

14. The packet transmission apparatus according to claim 9, wherein the program further comprises instructions that cause the apparatus to: before receiving the at least one first packet from the first device, determine that the update condition of the cycle mapping relationship is met.

15. The packet transmission apparatus according to claim 14, wherein the program further comprises instructions that cause the apparatus to: when a first cycle of the apparatus after a latest moment at which a packet in a current cycle of an egress interface of the first device arrives at an egress interface of the apparatus is earlier than a cycle of the apparatus that is corresponding to the current cycle in an old cycle mapping relationship, determine that the update condition of the cycle mapping relationship is met.

* * * * *